(12) United States Patent
Moon et al.

(10) Patent No.: US 10,790,881 B2
(45) Date of Patent: Sep. 29, 2020

(54) ELECTRONIC DEVICES INCLUDING CIRCUITS CONFIGURED TO ADJUST PEAK INTENSITY OF CURRENT

(71) Applicant: Samsung Electronics Co., Ltd., Suwon-si, Gyeonggi-do (KR)

(72) Inventors: Youngjin Moon, Seoul (KR); Hyoungseok Oh, Seoul (KR); Sungwoo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 211 days.

(21) Appl. No.: 15/962,453

(22) Filed: Apr. 25, 2018

(65) Prior Publication Data
US 2019/0052315 A1 Feb. 14, 2019

(30) Foreign Application Priority Data

Aug. 8, 2017 (KR) .................. 10-2017-0100537

(51) Int. Cl.
| | | |
|---|---|---|
| *G06K 5/00* | (2006.01) | |
| *H04B 5/00* | (2006.01) | |
| *G06K 7/08* | (2006.01) | |
| *G06K 19/04* | (2006.01) | |
| *G06K 19/06* | (2006.01) | |
| *G06Q 20/32* | (2012.01) | |
| *G06Q 20/34* | (2012.01) | |

(Continued)

(52) U.S. Cl.
CPC ........... *H04B 5/0056* (2013.01); *G06K 7/084* (2013.01); *G06K 19/042* (2013.01); *G06K 19/06206* (2013.01); *G06Q 20/322* (2013.01); *G06Q 20/3278* (2013.01); *G06Q 20/352* (2013.01); *G06Q 20/36* (2013.01); *G06Q 20/3829* (2013.01); *H04B 5/0031* (2013.01); *H04B 5/0075* (2013.01)

(58) Field of Classification Search
CPC .......... G06K 19/042; G06K 19/06206; G06K 7/084; G06Q 20/322; G06Q 20/3278; G06Q 20/352; G06Q 20/36; G06Q 20/3829; H04B 5/0031; H04B 5/0056; H04B 5/0075
See application file for complete search history.

(56) References Cited

U.S. PATENT DOCUMENTS

| | | | |
|---|---|---|---|
| 6,215,262 B1 * | 4/2001 | Lim .................. | H02P 25/08 |
| | | | 318/254.1 |
| 9,345,901 B2 | 5/2016 | Peterchev | |

(Continued)

FOREIGN PATENT DOCUMENTS

| | | |
|---|---|---|
| KR | 10-2016-0055680 | 5/2016 |
| KR | 10-1720329 | 3/2017 |

*Primary Examiner* — Thien M Le
(74) *Attorney, Agent, or Firm* — Myers Bigel, P.A.

(57) ABSTRACT

An electronic device may include a transmission circuit and an inductive element. The inductive element may be configured to generate a wireless communication signal based on a current. The transmission circuit may be configured to output the current based on a supply voltage; to increase an intensity of the current, from zero to an increased intensity that is less than or equal to a target value, by alternately repeating a first increase and a first decrease of the intensity of the current, in a first time interval; to decrease the intensity of the current, from the increased intensity to zero, by alternately repeating a second increase and a second decrease of the intensity of the current, in a second time interval.

20 Claims, 18 Drawing Sheets

(51) Int. Cl.
*G06Q 20/36* (2012.01)
*G06Q 20/38* (2012.01)

(56) References Cited

U.S. PATENT DOCUMENTS

| | | | |
|---|---|---|---|
| 9,361,613 B2 | 6/2016 | Wallner | |
| 2009/0196388 A1* | 8/2009 | Fukaishi | H01L 23/48 |
| | | | 375/360 |
| 2009/0233546 A1* | 9/2009 | Sasaki | H04B 5/02 |
| | | | 455/41.1 |
| 2015/0079914 A1* | 3/2015 | Takahashi | H01Q 1/3241 |
| | | | 455/127.2 |
| 2016/0094046 A1* | 3/2016 | Kato | H02J 50/12 |
| | | | 307/104 |
| 2016/0203472 A1 | 7/2016 | Wallner | |
| 2016/0210615 A1 | 7/2016 | Lee et al. | |
| 2016/0210616 A1 | 7/2016 | Lee et al. | |
| 2016/0308587 A1 | 10/2016 | Lee et al. | |
| 2016/0345125 A1 | 11/2016 | Kim et al. | |
| 2017/0047636 A1 | 2/2017 | Lee et al. | |
| 2017/0070104 A1* | 3/2017 | Chung | H02J 50/40 |
| 2017/0264142 A1* | 9/2017 | Ogawa | H02J 50/90 |
| 2018/0032850 A1* | 2/2018 | Lee | G06K 19/06196 |

\* cited by examiner

FIG. 16

| VDD | R | I1 |
|---|---|---|
| 4.40[V] | 1.80[Ω] | I1M=2.44[A] → I1T=2.00[A] |
| 4.00[V] | 1.80[Ω] | I1M=2.22[A] → I1T=2.00[A] |
| 3.60[V] | 1.80[Ω] | I1M=2.00[A] → I1T=2.00[A] |
| 3.20[V] | 1.80[Ω] | I1M=1.78[A] |
| 2.80[V] | 1.80[Ω] | I1M=1.56[A] | though they may be referred to by the following figures shows# ELECTRONIC DEVICES INCLUDING CIRCUITS CONFIGURED TO ADJUST PEAK INTENSITY OF CURRENT

CROSS-REFERENCE TO RELATED APPLICATION

The present application claims priority under 35 U.S.C. § 119 to Korean Patent Application No. 10-2017-0100537, filed on Aug. 8, 2017 in Korean Intellectual Property Office, the entire contents of which are incorporated herein in their entirety by reference.

TECHNICAL FIELD

Embodiments of the inventive concepts relate to electronic circuits and electronic devices, and more particularly, to configurations and methods for controlling an operation of the electronic circuits and/or electronic devices.

DESCRIPTION OF THE RELATED ART

In recent years, various kinds of electronic devices are being used. An electronic device may perform its own functions according to operations of electronic circuits included therein. The electronic device may operate while communicating with other external devices. To this end, the electronic device may include a communication circuit (e.g., a transmission circuit, a reception circuit, and/or the like).

Communication between two electronic devices may be performed in a wired or wireless manner. In particular, since wireless communication may improve user convenience, various technologies associated with the wireless communication are being developed and advanced. The wireless communication between two electronic devices may be performed at a near distance or a far distance.

Magnetic secure transmission (MST) is one of various methods for performing near field wireless communication. MST may be employed, for example, to exchange card information and financial information between a user device and a reader device without a magnetic credit card or an integrated circuit (IC) credit card. MST may be widely employed in various user devices due to user convenience. In addition, MST may not require a dedicated reader and may not require changing a configuration of an existing reader device. Accordingly, MST-based communication may be regarded as being very useful and advantageous.

Many user devices are portable and may operate using batteries. Accordingly, reducing power consumption may be an important issue in a portable electronic device. MST-based communication may also consume power in a user device, and thus, implementing MST with reduced power consumption may be helpful to improve the user satisfaction.

SUMMARY

Some embodiments of the inventive concepts may provide configurations and operations of an electronic device which includes a transmission circuit (e.g., an MST circuit). In some embodiments, the transmission circuit may be configured to adjust a peak intensity of current to reduce power consumption. In some embodiments, the transmission circuit may adjust the intensity of the current such that an increase and a decrease in the intensity of the current are alternately repeated.

In some embodiments, electronic devices are provided. An electronic device may include a transmission circuit and an inductive element. The inductive element may be configured to generate a wireless communication signal based on a current. The transmission circuit may be configured to output the current based on a supply voltage. The transmission circuit may be configured to increase an intensity of the current, from 0 (zero) to an increased intensity that is less than or equal to a target value, by alternately repeating a first increase of the intensity of the current and a first decrease of the intensity of the current, in a first time interval. The transmission circuit may be configured to decrease the intensity of the current, from the increased intensity to 0, by alternately repeating a second increase of the intensity of the current and a second decrease of the intensity of the current, in a second time interval.

In some embodiments, electronic devices are provided. An electronic device may include a transmission circuit and an inductive element. The transmission circuit may include a driver and a plurality of switches. The driver may be configured to generate a plurality of driving signals based on data and a control signal. The plurality of switches may be configured to provide paths for outputting a current in response to the plurality of driving signals. The inductive element may be configured to perform wireless communication corresponding to the data with an external device by receiving the current from the switches and generating an output signal based on the current. The driver may be configured to vary a level of the current corresponding to values of the data. The driver may be configured to generate the plurality of driving signals such that a first increase of an intensity of the current and a first decrease of the intensity of the current are alternately repeated in a first time interval to increase the intensity of the current from 0 to an increased intensity that is less than or equal to a target value, and such that a second increase of the intensity of the current and a second decrease of the intensity of the current are alternately repeated in a second time interval to decrease the intensity of the current from the increased intensity to 0.

In some embodiments, electronic devices are provided. An electronic device may include an inductive element and a transmission circuit. The inductive element may be configured to generate an output signal based on a current. The transmission circuit may be configured to adjust an intensity of the current such that the intensity of the current does not exceed a target value and provide the current to the inductive element. The transmission circuit may be configured to increase the intensity of the current from 0 to a first reference value that is equal to or less than the target value in a first time interval. The transmission circuit may be configured to decrease the intensity of the current to a second reference value that is less than the first reference value in a second time interval in response to the intensity of the current becoming equal to or greater than the first reference value. The transmission circuit may be configured to increase the intensity of the current in a third time interval in response to the intensity of the current becoming equal to or less than the second reference value in the second time interval. The transmission circuit may be configured to decrease the intensity of the current to 0 in a fourth time interval. The transmission circuit may be configured to alternately repeat the second time interval and the third time interval between the first time interval and the fourth time interval.

According to some embodiments, an amount of power consumed by a transmission circuit and an electronic device may be reduced. According to some embodiments, MST-based communication may be performed with a small amount of power.

BRIEF DESCRIPTION OF THE DRAWINGS

Embodiments of the inventive concepts will be more clearly understood in view of the detailed description and the accompanying drawings, wherein like reference numerals may refer to like parts throughout the various figures unless otherwise specified.

FIG. 16 is a table indicating a peak intensity of current adjusted in the transmission circuit of FIG. 3 according to some embodiments of the inventive concepts.

DETAILED DESCRIPTION OF THE EMBODIMENTS

Some embodiments of the inventive concepts will be described in detail and clearly with reference to the accompanying drawings.

Figure 1:
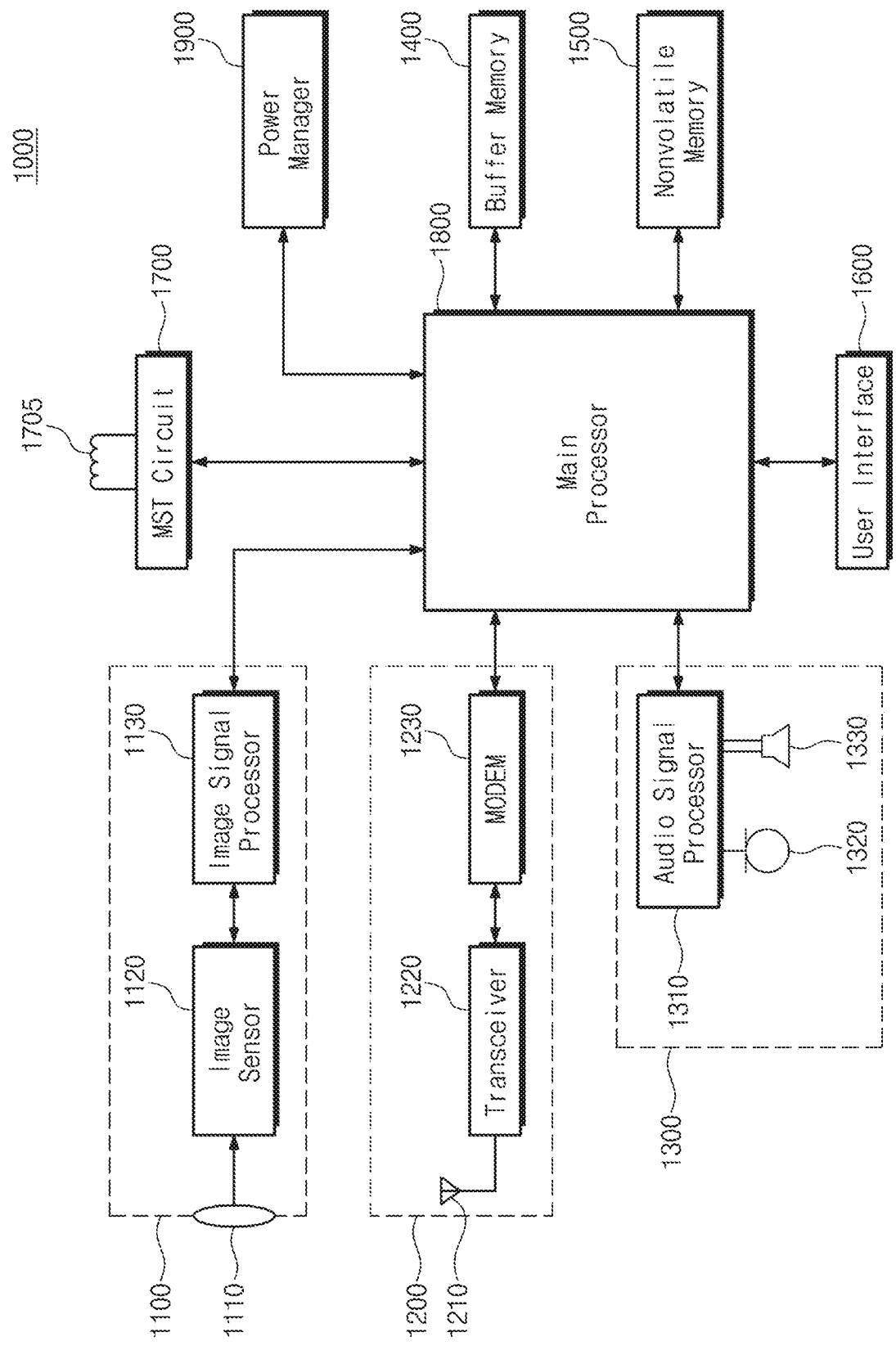
FIG. 1 is a block diagram illustrating an electronic device including an electronic circuit according to some embodiments of the inventive concepts.

FIG. 1 is a block diagram illustrating an electronic device including an electronic circuit according to some embodiments of the inventive concepts. Referring to FIG. 1, an electronic device 1000 may be implemented with one of various types of electronic devices such as a smart phone, a tablet computer, a laptop computer, a wearable device, and/or the like.

The electronic device 1000 may include various electronic circuits. For example, the electronic circuits of the electronic device 1000 may include an image processing circuit 1100, a communication circuit 1200, an audio processing circuit 1300, a buffer memory 1400, a nonvolatile memory 1500, a user interface 1600, a magnetic secure transmission (MST) circuit 1700, an inductive element 1705, a main processor 1800, and a power manager 1900.

The image processing circuit 1100 may receive light through a lens 1110. An image sensor 1120 and an image signal processor 1130 included in the image processing circuit 1100 may generate image information associated with an external object, based on the received light.

The communication circuit 1200 may exchange signals with an external device/system through an antenna 1210. A transceiver 1220 and a modulator/demodulator (MODEM) 1230 of the communication circuit 1200 may process signals exchanged with the external device/system, in compliance with a wireless communication protocol such as long term evolution (LTE), worldwide interoperability for microwave access (WIMAX), global system for mobile communication (GSM), code division multiple access (CDMA), wireless fidelity (Wi-Fi), radio frequency identification (RFID), Bluetooth, and/or the like.

The audio processing circuit 1300 may process sound information using an audio signal processor 1310, and thus may play and output the audio. The audio processing circuit 1300 may receive an audio input through a microphone 1320. The audio processing circuit 1300 may play an audio output through a speaker 1330.

The buffer memory 1400 may store data used in an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), and/or a synchronous DRAM (SDRAM), and/or a nonvolatile memory such as a phase-change RAM (PRAM), a magneto-resistive RAM (MRAM), a resistive RAM (ReRAM), and/or a ferroelectric RAM (FRAM).

The nonvolatile memory 1500 may store data regardless of power being supplied. For example, the nonvolatile memory 1500 may include at least one of various nonvolatile memories such as a flash memory, a PRAM, an MRAM, a ReRAM, and/or an FRAM. For example, the nonvolatile memory 1500 may include a removable memory such as a secure digital (SD) card, and/or an embedded memory such as an embedded multimedia card (eMMC).

The user interface 1600 may arbitrate communication between a user and the electronic device 1000. For example, the user interface 1600 may include input interfaces such as a keypad, a button, a touch screen, a touch pad, a gyroscope sensor, a vibration sensor, an acceleration sensor, and/or the like. For example, the user interface 1600 may include output interfaces such as a motor, a light emitting diode (LED) display, an organic LED (OLED) display, an active matrix OLED (AMOLED) display, an LED lamp, and/or the like.

The MST circuit 1700 may wirelessly communicate with an external device/system (e.g., a reader device). The MST circuit 1700 may communicate with the external device/system through the inductive element 1705. Communication through the inductive element 1705 will be described with reference to FIGS. 3 and 4. In addition, some configurations and operations of the MST circuit 1700 will be described with reference to FIGS. 5 to 20.

The main processor 1800 may control overall operations of the electronic device 1000. The main processor 1800 may control/manage operations of components of the electronic device 1000. The main processor 1800 may process various operations to operate the electronic device 1000. For example, the main processor 1800 may be implemented with an operation processing device/circuit, which includes one or more processor cores, such as a general-purpose processor, a special-purpose processor, an application processor, or a microprocessor.

The power manager 1900 may provide power to the components of the electronic device 1000. For example, the power manager 1900 may suitably convert power received from a battery and/or an external power source, and may transfer the converted power to the components of the electronic device 1000.

However, the components illustrated in FIG. 1 are provided to facilitate better understanding, and are not intended to limit the inventive concepts. The electronic device 1000 may not include one or more of the components illustrated in FIG. 1, and additionally or alternatively, may include at least one component not illustrated in FIG. 1.

Figure 2:
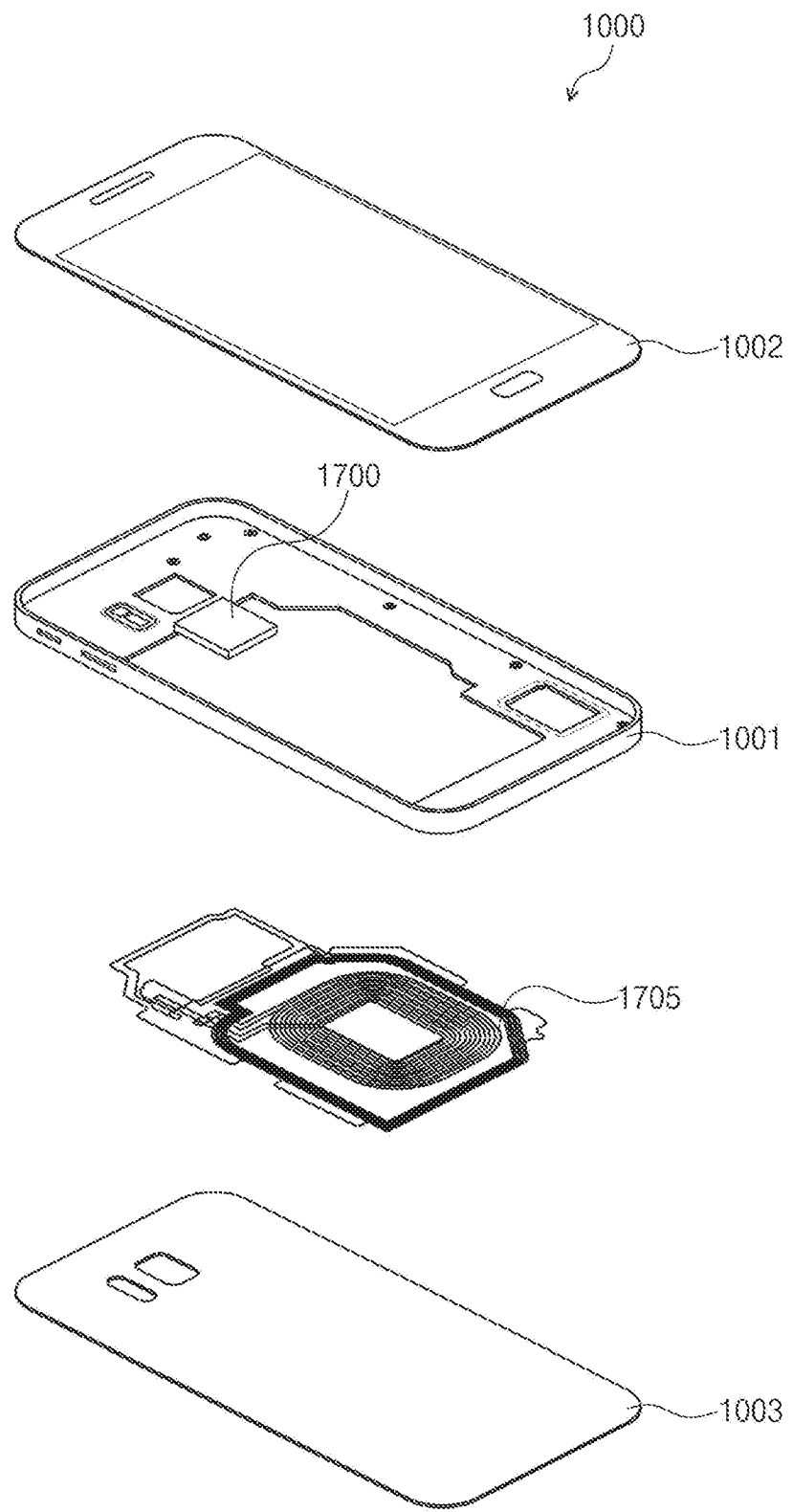
FIG. 2 is an exploded view illustrating the electronic device of FIG. 1 according to some embodiments of the inventive concepts.

FIG. 2 is an exploded view illustrating the electronic device of FIG. 1. Referring to FIG. 2, the electronic device 1000 may be a smart phone. However, the inventive concepts are not limited thereto. It may be readily understood that a configuration similar to a configuration illustrated in FIG. 2 may be employed in another type of electronic device.

The electronic device 1000 may include a housing 1001 containing various electronic circuits in the electronic device 1000. For example, components of the electronic device 1000 such as the MST circuit 1700 may be within the housing 1001, and thus may be equipped in the electronic device 1000. The MST circuit 1700 may include an electronic circuit chip or chip package. The electronic device 1000 may include an upper cover 1002 and a lower cover 1003 that separate an inner space of the housing 1001 from outside of the electronic device 1000.

The inductive element 1705 may include a conductive material. The inductive element 1705 may include a coil to generate a magnetic flux based on a current. The inductive element 1705 may be connected to the MST circuit 1700. The inductive element 1705 may generate the magnetic flux in response to a current provided from the MST circuit 1700. The electronic device 1000 may wirelessly communicate with an external device/system using the magnetic flux generated by the inductive element 1705.

The inductive element 1705 may be between the upper cover 1002 and the lower cover 1003. For example, the inductive element 1705 may be close to the outside of the electronic device 1000 (e.g., in contact with an inner surface of the lower cover 1003), to provide stable and precise communication.

However, the embodiments illustrated in FIG. 2 are provided to facilitate better understanding, and are not intended to limit the inventive concepts. Shape, disposition, location, and connection of each component may be variously changed or modified depending on factors such as a type, a configuration, a function, and/or the like, of the electronic device 1000.

Figure 3:
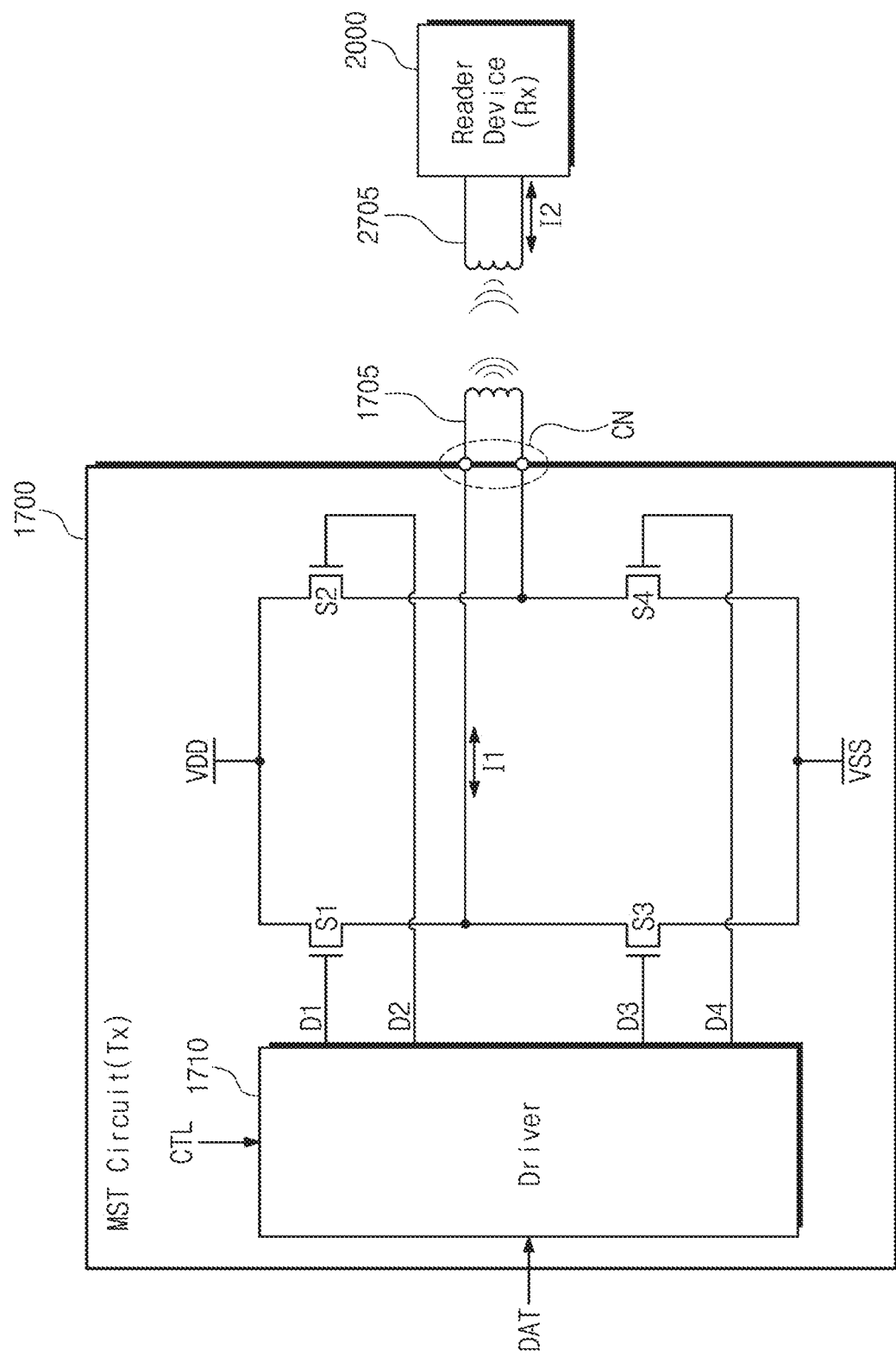
FIG. 3 is a block diagram illustrating the magnetic secure transmission (MST) circuit of FIG. 1 according to some embodiments of the inventive concepts.

FIG. 3 is a block diagram illustrating the MST circuit 1 of FIG. 1 according to some embodiments of the inventive concepts.

Referring to FIGS. 1 and 3, the MST circuit 1700 may be connected to the inductive element 1705 through connection nodes CN. The MST circuit 1700 may output a current I1, and the inductive element 1705 may generate a magnetic flux based on the current I1 from the MST circuit 1700.

The MST circuit 1700 may generate the current I1 based on data DAT. In some embodiments, the data DAT may include information of a credit card. For example, the data DAT may include information associated with a type, an identification number, an expiration date, and/or the like, of the credit card. However, embodiments of the inventive concepts are not limited thereto. For example, the data DAT may include other kinds of information. In some embodiments, the credit card may belong to, may be associated with, and/or may be in the possession of a user of the electronic device 1000.

In some embodiments, the data DAT may be stored in the buffer memory 1400 and/or the nonvolatile memory 1500. The data DAT may be directly read from the buffer memory 1400 and/or the nonvolatile memory 1500, or may be read through the main processor 1800. In some embodiments, the data DAT may be stored in an internal memory of the main processor 1800. For example, when the data DAT includes information of a credit card, the data DAT may be stored in a secure area included in the buffer memory 1400, the nonvolatile memory 1500, and/or the internal memory of the main processor 1800.

A level of the current I1 may vary corresponding to values of the data DAT. A magnetic flux may be induced in the inductive element 1705 in response to the variation on the level of the current I1. The inductive element 1705 may output an output signal (e.g., the induced magnetic flux) based on the current I1. The output signal may be received by a reader device 2000, and thus wireless communication may be performed corresponding to the data DAT.

The reader device 2000 may be an external device separate from the electronic device 1000. For example, the reader device 2000 may be an electronic device capable of collecting information of a credit card and providing financial services (e.g., payment management, credit information processing, and/or the like) based on the collected information.

The reader device 2000 may include an inductive element 2705. Similar to the inductive element 1705, the inductive element 2705 may include a conductive material and may be configured in a form of a coil. Current I2 may be generated along the inductive element 2705 based on the magnetic flux generated by the inductive element 1705.

The reader device 2000 may obtain information associated with the data DAT, based on the current I2. For example, when the data DAT includes information of a credit card, the reader device 2000 may obtain the information of the credit card based on the current I2. Accordingly, the MST circuit 1700 may be employed to exchange card information and/or financial information between the electronic device 1000 and the reader device 2000. In some embodiments, the user of the electronic device 1000 may provide card information and/or financial information to the reader device 2000 without a magnetic credit card or an integrated circuit (IC) credit card.

The above descriptions are associated with communication for exchanging card information and/or financial information, but the inventive concepts are not limited thereto.

Communication between the MST circuit 1700 and the reader device 2000 may be employed to exchange other kinds of information.

In addition, the above descriptions are associated with MST-based communication using the MST circuit 1700 and the inductive element 1705, but the inventive concepts are not limited thereto. It may be readily understood that some embodiments of the inventive concepts may be employed to various other kinds of communication for exchanging information based on the current I1. Moreover, the MST circuit 1700 may operate to transmit information to the reader device 2000, and the reader device 2000 may operate to receive information from the electronic device 1000 including the MST circuit 1700. Accordingly, the MST circuit 1700 may be referred to more generally as a "transmission circuit" 1700, and the reader device 2000 may be referred to as a "reception device" 2000.

In some embodiments, the transmission circuit 1700 may include a driver 1710 and switches S1, S2, S3, and S4. The driver 1710 may receive the data DAT and/or a control signal CTL. The driver 1710 may generate driving signals D1, D2, D3, and D4 based on the data DAT and/or the control signal CTL. In some embodiments of the inventive concepts, the transmission circuit 1700 may include a different number of switches and/or driving signals.

The driving signals D1, D2, D3, and D4 may control the switches S1, S2, S3, and S4, respectively. The control signal CTL may affect generating the driving signals D1, D2, D3, and D4, and thus may affect controlling the switches S1, S2, S3, and S4. Controlling the switches S1, S2, S3, and S4 will be described in more detail with reference to FIGS. 7 to 9. Generating the control signal CTL will be described in more detail with reference to FIGS. 6 and 10 to 20.

The switches S1, S2, S3, and S4 may provide paths for the current I1 in response to the driving signals D1, D2, D3, and D4, respectively. The current I1 flowing through the switches S1, S2, S3, and S4 may be provided to the inductive element 1705. The current I1 may flow from a first end of the inductive element 1705 to a second end thereof, or may flow from the second end of the inductive element 1705 to the first end thereof.

It will be understood that, although the terms "first," "second," etc. may be used herein to describe various elements, these elements should not be limited by these terms. These terms are only used to distinguish one element from another. Thus, a first element could be termed a second element without departing from the teachings of the present inventive concepts.

For example, the switches S1, S2, S3, and S4 may include metal-oxide-semiconductor field-effect transistors (MOSFETs), and may be turned on or turned off in response to the driving signals D1, D2, D3, and D4, respectively. However, the inventive concepts are not limited to this example, and the switches S1, S2, S3, and S4 may include various kinds of elements for providing a current path.

The current I1 may be generated based on supply voltages VDD and VSS. For example, the supply voltage VDD may be converted from a battery voltage of a battery included in the electronic device 1000. For example, the supply voltage VSS may correspond to a reference voltage or a ground voltage. However, the inventive concepts are not limited to these examples, and the supply voltages VDD and VSS may be variously changed or modified to generate the current I1.

The transmission circuit 1700 may output the current I1 through the switches S1, S2, S3, and S4 based on the supply voltage VDD. Accordingly, the current I1 may be affected by the supply voltage VDD. For example, when the supply voltage VDD is provided from the battery voltage, the current I1 may be affected by the battery voltage. This will be further described with reference to FIG. 5.

One end of the switch S1 may be connected to the supply voltage VDD, and the other end of the switch S1 may be connected to the first end of the inductive element 1705. One end of the switch S2 may be connected to the supply voltage VDD together with the one end of the switch S1, and the other end of the switch S2 may be connected to the second end of the inductive element 1705.

One end of the switch S3 may be connected to the first end of the inductive element 1705 together with the other end of the switch S1, and the other end of the switch S3 may be connected to the supply voltage VSS. One end of the switch S4 may be connected to the second end of the inductive element 1705 together with the other end of the switch S2, and the other end of the switch S4 may be connected to the supply voltage VSS together with the other end of the switch S3.

According to the above connection, as the switches S1, S2, S3, and S4 are respectively turned on or turned off in response to the driving signals D1, D2, D3, and D4, the current I1 may be generated through the switches S1, S2, S3, and S4 based on the supply voltages VDD and VSS. Operations including turning the switches S1, S2, S3, and S4 on or off will be described in more detail with reference to FIGS. 7 to 9.

Figure 4:
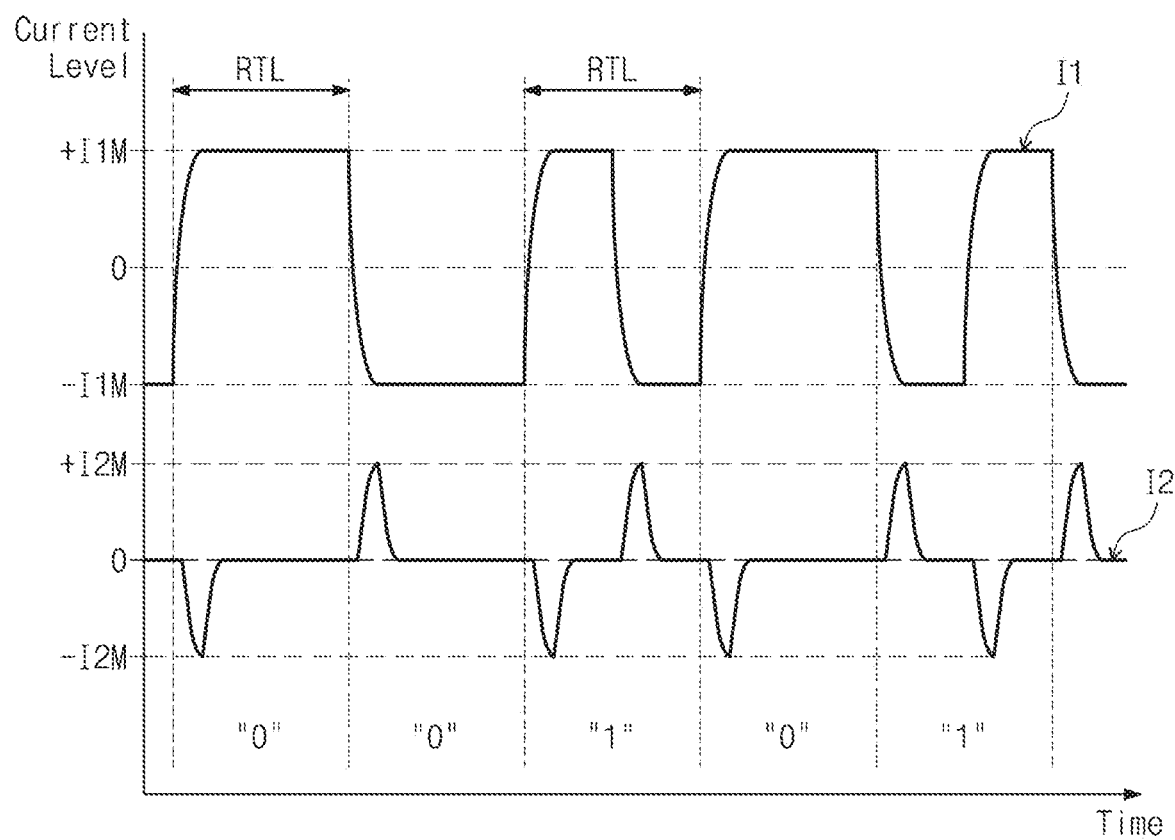
FIG. 4 is a timing diagram illustrating communication between the transmission circuit and the reception device of FIG. 3 according to some embodiments of the inventive concepts.

FIG. 4 is a timing diagram illustrating communication between the transmission circuit and the reception device of FIG. 3 according to some embodiments of the inventive concepts.

In some embodiments, a level of the current I1 may vary between a positive maximum level +I1M and a negative maximum level −I1M. It may be understood that a direction in which the current I1 having a positive level flows is opposite to a direction in which the current I1 having a negative level flows. The variation on the level of the current I1 may include a first transition and a second transition.

For example, in the first transition the level of the current I1 may change from the negative maximum level −I1M to the positive maximum level +I1M, and in the second transition the level of the current I1 may change from the positive maximum level +I1M to the negative maximum level −I1M. Alternatively, in the first transition the level of the current I1 may change from the positive maximum level +I1M to the negative maximum level −I1M, and in the second transition the level of the current I1 may change from the negative maximum level −I1M to the positive maximum level +I1M. The first transition and the second transition may be repeated alternately.

The level of the current I1 may vary corresponding to values of the data DAT. In some embodiments, frequency of alternation of the first transition and the second transition may be associated with the values of the data DAT. For example, frequency of occurrence of the first transition and the second transition during a reference time interval RTL may indicate a value of the data DAT.

For example, when the value of the data DAT corresponds to a first logic value (e.g., logic "0"), the second transition may not occur during the reference time interval RTL after the first transition. On the other hand, when the value of the data DAT corresponds to a second logic value (e.g., logic "1"), the second transition may occur within the reference time interval RTL after the first transition.

However, the above embodiments are provided to facilitate better understanding, and are not intended to limit the inventive concepts. The variation of the current I1 may be changed or modified to indicate the values of the data DAT suitably.

When the current I1 having a varying level flows along the inductive element 1705, a magnetic flux may be induced in the inductive element 1705. The magnetic flux induced in the inductive element 1705 may cause a magnetic flux to be induced in the inductive element 2705 through magnetic coupling. The magnetic flux induced in the inductive element 2705 may cause the current I2 flowing along the inductive element 2705.

Accordingly, the current I2 may be generated based on the current I1. A level of the current I2 may also vary in response to the first transition and the second transition of the current I1. The level of the current I2 may vary between a positive maximum level +I2M and a negative maximum level −I2M.

The reception device 2000 may obtain information corresponding to the data DAT, based on the variation on the level of the current I2. For example, when the level of the current I2 varies once during the reference time interval RTL, the reception device 2000 may recognize the first logic value of the data DAT. For example, when the level of the current I2 varies twice during the reference time interval RTL, the reception device 2000 may recognize the second logic value of the data DAT. In such a manner, the reception device 2000 may obtain information corresponding to the data DAT.

Figure 5:
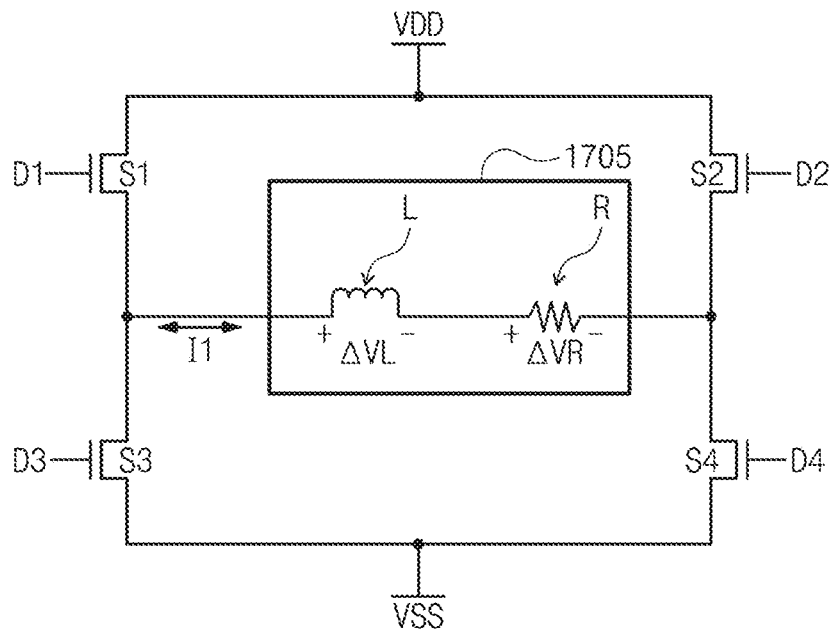
FIG. 5 is a block diagram schematically illustrating the inductive element of FIG. 3 and an intensity of current flowing along the inductive element according to some embodiments of the inventive concepts.

FIG. 5 is a block diagram schematically illustrating the inductive element of FIG. 3 and an intensity of the current flowing along the inductive element according to some embodiments of the inventive concepts.

The current I1 may have a level and an intensity. The current I1 may have a positive level or a negative level depending on a direction in which the current I1 flows. The intensity of the current I1 may become greater as the level of the current I1 becomes greater in a positive direction or a negative direction. It may be understood that the intensity of the current I1 may be associated with an absolute value of the level of the current I1 and may not be related to a polarity of the level of the current I1.

The inductive element 1705 may include an inductive component L. An ideal inductive element may include only an inductive component, but the actual inductive element 1705 may also include a resistance component R.

As the current I1 flows along the inductive element 1705, a voltage drop ΔVL may occur in the inductive component L and a voltage drop ΔVR may occur in the resistance component R. Due to a characteristic of the inductive element 1705, the inductive element 1705 may operate as if the inductive element 1705 is short-circuited when some time elapses. Accordingly, when some time elapses, the voltage drop ΔVL may converge to 0 (zero), and only the voltage drop ΔVR may be observed (a saturation state). At the saturation state, the intensity of the current I1 may correspond to a value obtained by dividing a quantity of the voltage drop ΔVR by a resistance value of the resistance component R, and the current I1 may have the positive maximum level +I1M or the negative maximum level −I1M.

Ignoring a resistance component of each of the switches S1, S2, S3, and S4, the quantity of the voltage drop ΔVR may substantially correspond to the supply voltage VDD. Accordingly, the intensity of the current I1 may substantially correspond to a value obtained by dividing a voltage value of the supply voltage VDD by the resistance value of the resistance component R.

As described with reference to FIG. 3, for example, the supply voltage VDD may be provided from a battery voltage and the supply voltage VDD may become higher as the battery voltage becomes higher (e.g., as the battery is greatly charged). Accordingly, the intensity of the current I1 may become greater as the battery voltage becomes higher and the intensity of the current I1 may become smaller as the battery voltage becomes lower (e.g., as the battery gets being discharged).

An increased amount of power may be consumed as the intensity of the current I1 increases. Accordingly, the amount of power consumed by the transmission circuit 1700 may vary depending on the battery voltage. For example, the transmission circuit 1700 may consume an increased amount of power as the battery voltage becomes higher.

The electronic device 1000 may be a portable device that operates using a battery. Accordingly, reducing power consumption may be an important issue in the electronic device 1000. Taking into account this issue, it may be advantageous to limit the intensity of the current I1 to below a target value to make the transmission circuit 1700 consume a decreased amount of power when the battery voltage is high. To this end, in some embodiments, the transmission circuit 1700 may adjust the intensity of the current I1.

Figure 6:
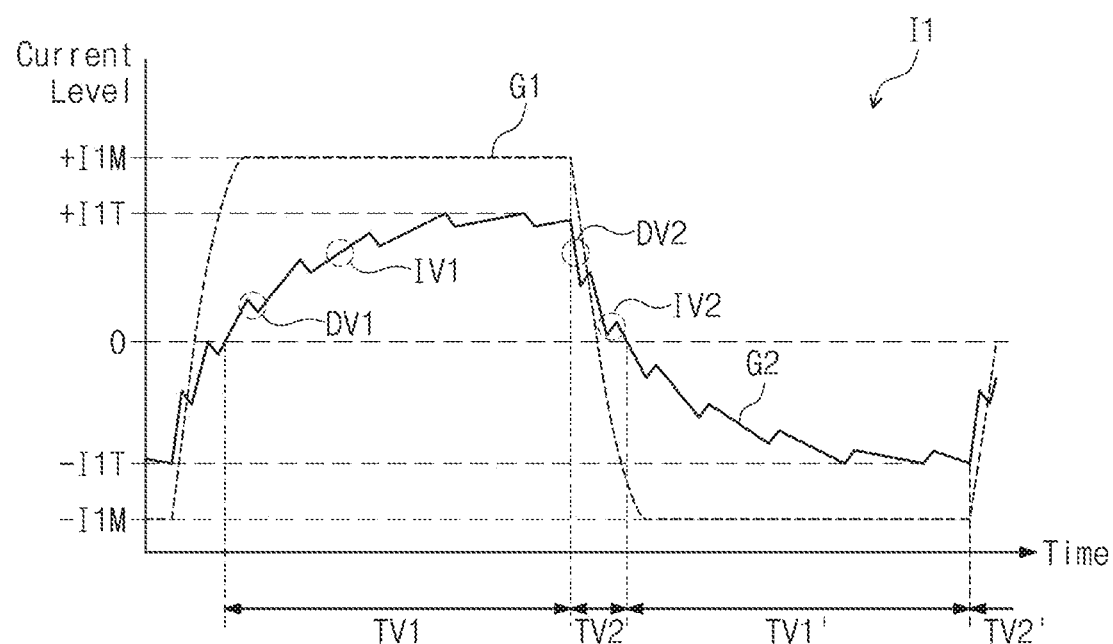
FIG. 6 is a timing diagram illustrating operations for adjusting a peak intensity of current in the transmission circuit of FIG. 3 according to some embodiments of the inventive concepts.

FIG. 6 is a timing diagram illustrating operations for adjusting a peak intensity of the current in the transmission circuit of FIG. 3 according to some embodiments of the inventive concepts.

The peak intensity of the current I1 may refer to the greatest intensity of the current I1 (i.e., the intensity corresponding to the greatest level in a positive direction or a negative direction). In FIG. 4, the peak intensity of the current I1 may be "I1M". As described with reference to FIG. 5, when the battery voltage is high, the peak intensity of the current I1 may be great.

A graph G1 of FIG. 6 illustrates variation on the level of the current I1 generated without adjusting the intensity, with as illustrated in FIG. 4. Referring to the graph G1, when the intensity of the current I1 is not adjusted, the level of the current I1 may change between the positive maximum level +I1M and the negative maximum level −I1M, and power consumption due to the current I1 may increase.

A graph G2 of FIG. 6 illustrates variation on the level of the current I1 generated by adjusting intensity according to some embodiments. The transmission circuit 1700 may adjust the intensity of the current I1 to reduce the peak intensity of the current I1. Referring to the graph G2, when the intensity of the current I1 is adjusted, the level of the current I1 may vary between a positive target level +I1T and a negative target level −I1T.

In the graph G2, the peak intensity of the adjusted current I1 may be "I1T". A value of "I1T" may be less than a value of "I1M". Accordingly, as the transmission circuit 1700 adjusts the intensity of the current I1, the peak intensity of the current I1 may decrease. As a result, even though the battery voltage is high, the amount of power consumed due to the current I1 may decrease.

The peak intensity "I1T" may be understood as a target value. The transmission circuit 1700 may adjust the intensity of the current I1, such that the intensity and the peak intensity of the current I1 do not exceed the target value, to reduce power consumption. The target value may be less than a value (e.g., the peak intensity "I1M" associated with the graph G1) obtained by dividing a maximum voltage value of the supply voltage VDD (e.g., a voltage value provided from a battery voltage of a fully charged battery) by the resistance value of the resistance component R of the inductive element 1705.

When the target value is great, the amount of power consumed due to the current I1 may not decrease effectively. On the other hand, when the target value is excessively small, the intensity of the current I1 may be weak and thus communication with the reception device 2000 may be unstable. Accordingly, the target value may be suitably selected taking into account power consumption and stable communication.

The transmission circuit 1700 may adjust the intensity of the current I1 such that an increase and a decrease in the intensity of the current I1 are repeated alternately, to decrease the peak intensity of the current I1. With regard to the graph G1 illustrating the level of the current I1 generated without adjusting the intensity, it may be understood that the positive maximum level +I1M or the negative maximum level −I1M maintains during a time interval (at the saturation state) after monotonic increasing or monotonic decreasing. With regard to the graph G2 illustrating the level of the current I1 generated by adjusting the intensity, it may be understood that an increase and a decrease are alternately repeated.

The graph G2 may include a first time interval TV1 and a second time interval TV2. In the first time interval TV1, the transmission circuit 1700 may increase the intensity of the current I1 from 0 (zero) toward the target value (e.g., the positive target level +I1T). In the second time interval TV2, the transmission circuit 1700 may decrease the intensity of the current I1, which has increased in the first time interval TV1, toward 0.

The second time interval TV2 may immediately follow the first time interval TV1. The first time interval TV1 and the second time interval TV2 may be alternately repeated for communication between the electronic device 1000 and the reception device 2000. For example, a first time interval TV1' and a second time interval TV2' may follow the second time interval TV2. In addition, another first time interval TV1' and another second time interval TV2' may follow the first time interval TV1 and the second time interval TV2.

In the first time interval TV1', the intensity of the current I1 may increase from 0 toward the target value (e.g., the negative target level −I1T). In the second time interval TV2', the intensity of the current I1 which has increased in the first time interval TV1' may decrease toward 0. The first time interval TV1 and the second time interval TV2 may be associated with a positive level of the current I1, and the first time interval TV1' and the second time interval TV2' may be associated with a negative level of the current I1.

However, except for this difference, the first time interval TV1' and the second time interval TV2' may be understood to be similar to the first time interval TV1 and the second time interval TV2. Accordingly, in the following descriptions, the first time interval TV1 and the second time interval TV2 will be described mainly, and descriptions associated with the first time interval TV1' and the second time interval TV2' may be omitted for brevity.

In the first time interval TV1, the transmission circuit 1700 may adjust the intensity of the current I1 such that a first increase and a first decrease in the intensity of the current I1 are repeated alternately while increasing the intensity of the current I1 toward the target value. For example, a first increase IV1 and a first decrease DV1 in the intensity of the current I1 may occur in the first time interval TV1.

An amount by which the intensity of the current I1 increases during each first increase (e.g., the first increase IV1) may be greater than an amount by which the intensity of the current I1 decreases during each first decrease (e.g., the first decrease DV1). Accordingly, the intensity of the current I1 may increase toward the target value while the first increase and the first decrease in the intensity of the current I1 are alternately repeated over the whole first time interval TV1.

In the second time interval TV2, the transmission circuit 1700 may adjust the intensity of the current I1 such that a second increase and a second decrease in the intensity of the current I1 are repeated alternately while decreasing the intensity of the current I1 toward 0. For example, a second increase IV2 and a second decrease DV2 in the intensity of the current I1 may occur in the second time interval TV2.

An amount by which the intensity of the current I1 increases during each second increase (e.g., the second increase IV2) may be less than an amount by which the intensity of the current I1 decreases during each second decrease (e.g., the second decrease DV2). Accordingly, the intensity of the current I1 may decrease toward 0 while the second increase and the second decrease in the intensity of the current I1 are alternately repeated over the whole second time interval TV2.

While the intensity of the current I1 increases from 0 toward the target value and while the increased intensity of the current I1 decreases toward 0, the transmission circuit 1700 may adjust the intensity of the current I1 such that an increase and a decrease in the intensity of the current I1 are alternately repeated. As an increase and a decrease in the level of the current I1 are alternately repeated, a slope of increasing in the first time interval TV1 and a slope of decreasing in the second time interval TV2 may be adjusted, and the saturation state of the inductive element 1705 may not occur. Accordingly, the peak intensity of the current I1 may be adjusted (e.g., may decrease), and the intensity of the current I1 may maintain below the target value.

Similar to those described with reference to FIG. 4, with regard to the graph G2, the variation on the level of the current I1 may include a first transition and a second transition. For example, the first transition may mean that the level of the current I1 changes from the negative maximum level −I1T to the positive maximum level +I1T, and the second transition may mean that the level of the current I1 changes from the positive maximum level +I1T to the negative maximum level −I1T. Alternatively, the first transition may mean that the level of the current I1 changes from the positive maximum level +I1T to the negative maximum level −I1T, and the second transition may mean that the level of the current I1 changes from the negative maximum level −I1T to the positive maximum level +I1T. The first transition and the second transition may be repeated alternately.

For example, when a value of the data DAT corresponds to a first logic value (e.g., logic "0"), the second transition may not occur during a reference time interval after the first transition. On the other hand, when a value of the data DAT corresponds to a second logic value (e.g., logic "1"), the second transition may occur within the reference time interval after the first transition.

Figure 7:
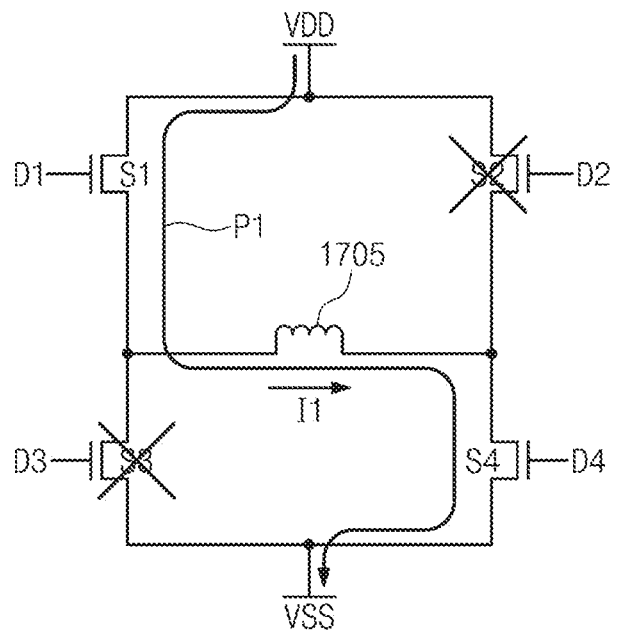
FIGS. 7 to 9 are schematic block diagrams illustrating current paths through switches and the inductive element of FIG. 3 according to some embodiments of the inventive concepts.
Figure 8:
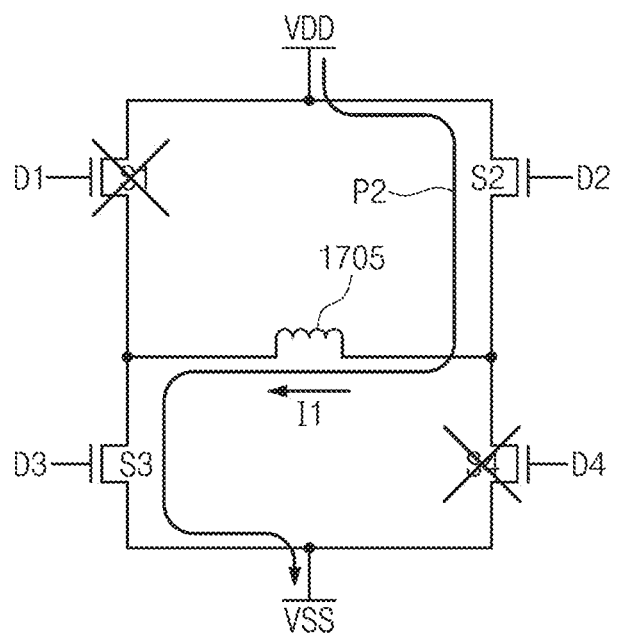
Figure 9:
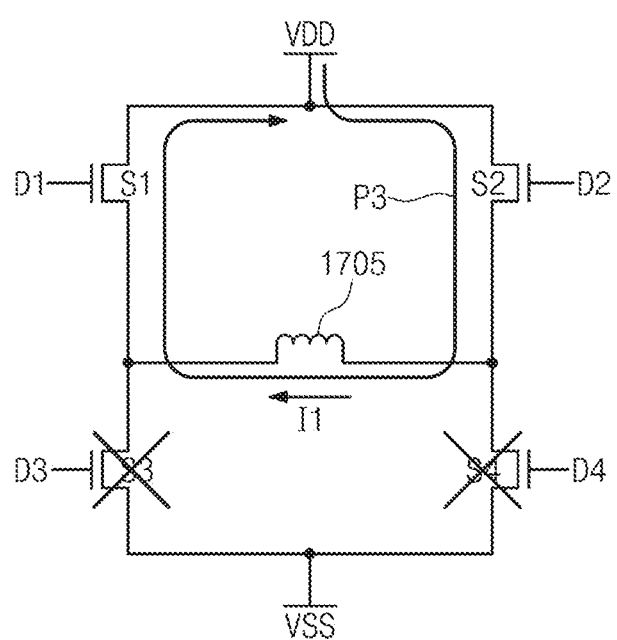

FIGS. 7 to 9 are schematic block diagrams illustrating current paths through the switches and the inductive element of FIG. 3 according to some embodiments of the inventive concepts.

Current paths may be controlled based on the driving signals D1, D2, D3, and D4 output from the driver 1710. The switches S1, S2, S3, and S4 may be respectively turned on or turned off in response to the driving signals D1, D2, D3, and D4, and thus may control a path for providing the current I1 to the inductive element 1705.

Referring to FIG. 7, the switches S1 and S4 may be respectively turned on in response to the driving signals D1 and D4, and the switches S2 and S3 may be respectively turned off in response to the driving signals D2 and D3. Based on the supply voltages VDD and VSS, the current I1 may flow from the first end of the inductive element 1705 to the second end of the inductive element 1705 through a path P1 along the switch S1, the inductive element 1705, and the switch S4. As used herein, a switch may be referred to as being "turned on" when it is in a closed (e.g. short circuit) state wherein current flows freely through the switch and may be referred to as being "turned off" when it is in an open (e.g. open circuit) state wherein current does not flow freely through the switch.

FIG. 7 illustrates the current I1 flowing in a positive direction. The intensity of the current I1 may increase in a positive direction in response to the current I1 of FIG. 7. For example, the first increase IV1 and the second increase IV2 of FIG. 6 may occur based on the current I1 of FIG. 7.

Referring to FIG. 8, the switches S2 and S3 may be respectively turned on in response to the driving signals D2 and D3, and the switches S1 and S4 may be respectively turned off in response to the driving signals D1 and D4. Based on the supply voltages VDD and VSS, the current I1 may flow from the second end of the inductive element 1705 to the first end of the inductive element 1705 through a path P2 along the switch S2, the inductive element 1705, and the switch S3.

FIG. 8 illustrates the current I1 flowing in a negative direction. The intensity of the current I1 may increase in a negative direction in response to the current I1 of FIG. 8. For example, the first decrease DV1 and the second decrease DV2 of FIG. 6 may occur based on the current I1 of FIG. 8.

Referring to FIG. 9, the switches S1 and S2 may be respectively turned on in response to the driving signals D1 and D2, and the switches S3 and S4 may be respectively turned off in response to the driving signals D3 and D4. Based on the supply voltage VDD, the current I1 may flow from the second end of the inductive element 1705 to the first end of the inductive element 1705 through a path P3 along the switch S2, the inductive element 1705, and the switch S1.

FIG. 9 illustrates the current I1 flowing in a negative direction. The intensity of the current I1 may increase in a negative direction in response to the current I1 of FIG. 9. Comparing FIG. 9 to FIG. 8, an amount by which the intensity of the current I1 is adjusted in response to the current I1 of FIG. 9 may be less than an amount by which the intensity of the current I1 is adjusted in response to the current I1 of FIG. 8. Accordingly, in FIG. 8 the intensity of the current I1 may be adjusted relatively fast, and in FIG. 9 the intensity of the current I1 may be adjusted relatively finely. For example, the first decrease DV1 of FIG. 6 may occur based on the current I1 of FIG. 9, and the second decrease DV2 of FIG. 6 may occur based on the current I1 of FIG. 8.

The driver 1710 may generate the driving signals D1, D2, D3, and D4 such that an increase and a decrease in the intensity of the current I1 are alternately repeated in the first time interval TV1 and the second time interval TV2. For example, the driver 1710 may generate the driving signals D1, D2, D3, and D4 of FIG. 7 and the driving signals D1, D2, D3, and D4 of FIG. 9 (or FIG. 8) alternately such that a first increase and a first decrease in the intensity of the current I1 are alternately repeated in the first time interval TV1. For example, the driver 1710 may generate the driving signals D1, D2, D3, and D4 of FIG. 8 and the driving signals D1, D2, D3, and D4 of FIG. 7 alternately such that a second decrease and a second increase in the intensity of the current I1 are alternately repeated in the second time interval TV2.

However, the paths P1, P2, and P3 described with reference to FIGS. 7 to 9 are provided to facilitate better understanding, and are not intended to limit the inventive concepts. Driving the switches S1, S2, S3, and S4 and a current path may be variously changed or modified to output the current I1 suitably.

Figure 10:
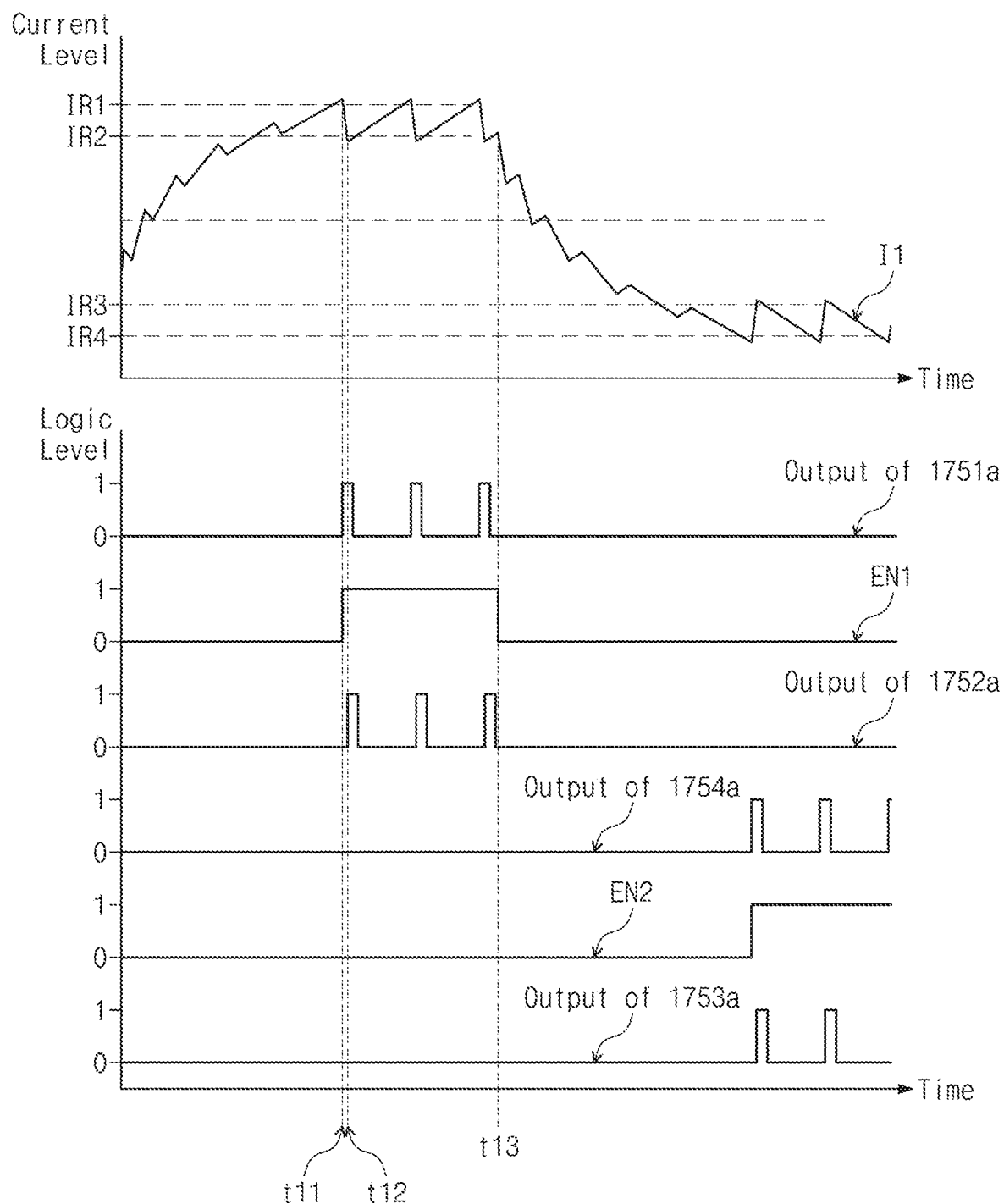
FIG. 10 is a timing diagram illustrating operations for adjusting a peak intensity of current in the transmission circuit of FIG. 3 according to some embodiments of the inventive concepts.

FIG. 10 is a timing diagram illustrating operations for adjusting a peak intensity of the current I1 in the transmission circuit of FIG. 3 according to some embodiments of the inventive concepts.

As described above, the level of the current I1 may vary between a positive target level (e.g., +I1T) and a negative target level (e.g., −I1T). In addition, during a first time interval (e.g., TV1) in which the intensity of the current I1 increases from 0 (zero) toward the target value and during a second time interval (e.g., TV2) in which the increased intensity of the current I1 decreases toward 0, an increase and a decrease in the intensity of the current I1 may be alternately repeated.

In some embodiments, the transmission circuit 1700 may compare the level of the current I1 to each of reference values IR1, IR2, IR3, and IR4. The reference values IR1 and IR2 may be associated with a positive level, and the reference values IR3 and IR4 may be associated with a negative level. The reference value IR2 may be less than the reference value IR1, and the reference value IR4 may be less than the reference value IR3.

For example, the transmission circuit 1700 may detect whether the level of the current I1 is equal to or greater than the reference value IR1, and may detect whether the level of the current I1 is equal to or less than the reference value IR2. For example, the transmission circuit 1700 may detect whether the level of the current I1 is equal to or greater than the reference value IR3, and may detect whether the level of the current I1 is equal to or less than the reference value IR4.

For example, the first time interval may include a third time interval and a fourth time interval. The third time interval may include a time interval where the intensity of the current I1 decreases in the first time interval. The fourth time interval may include a time interval where the intensity of the current I1 increases in the first time interval.

In some embodiments, the transmission circuit 1700 may decrease the intensity of the current I1 in the third time interval, in response to the level of the current I1 increasing to be equal to or greater than the reference value IR1 in the first time interval. In addition, the transmission circuit 1700 may increase the intensity of the current I1 in the fourth time interval, in response to the level of the current I1 decreasing to be equal to or less than the reference value IR2 in the third time interval.

The third time interval and the fourth time interval may be repeated alternately. Accordingly, the level of the current I1 may vary in a level range between the reference value IR1 and the reference value IR2. In the embodiments of FIG. 10, the third time interval and the fourth time interval may be repeated between a time point (e.g., a time point "t11") where the intensity of the current I1 is equal to or greater than the reference value IR1 for the first time in the first time interval and a time point (e.g., a time point "t13") where the second time interval starts.

For example, the reference value IR1 may be selected to be equal to or less than the target value (e.g., "I1T"). In this example, the intensity of the current I1 may not exceed the target value. In addition, the intensity of the current I1 may be prevented from being excessively small. The reference values IR1 and IR2 may be suitably selected taking into account power consumption and stable communication.

Similarly, the transmission circuit 1700 may decrease the intensity of the current I1 in the third time interval, in response to the level of the current I1 decreasing to be equal to or less than the reference value IR4. In addition, the transmission circuit 1700 may increase the intensity of the current I1 in the fourth time interval, in response to the level of the current I1 increasing to be equal to or greater than the reference value IR3 in the third time interval.

Figure 11:
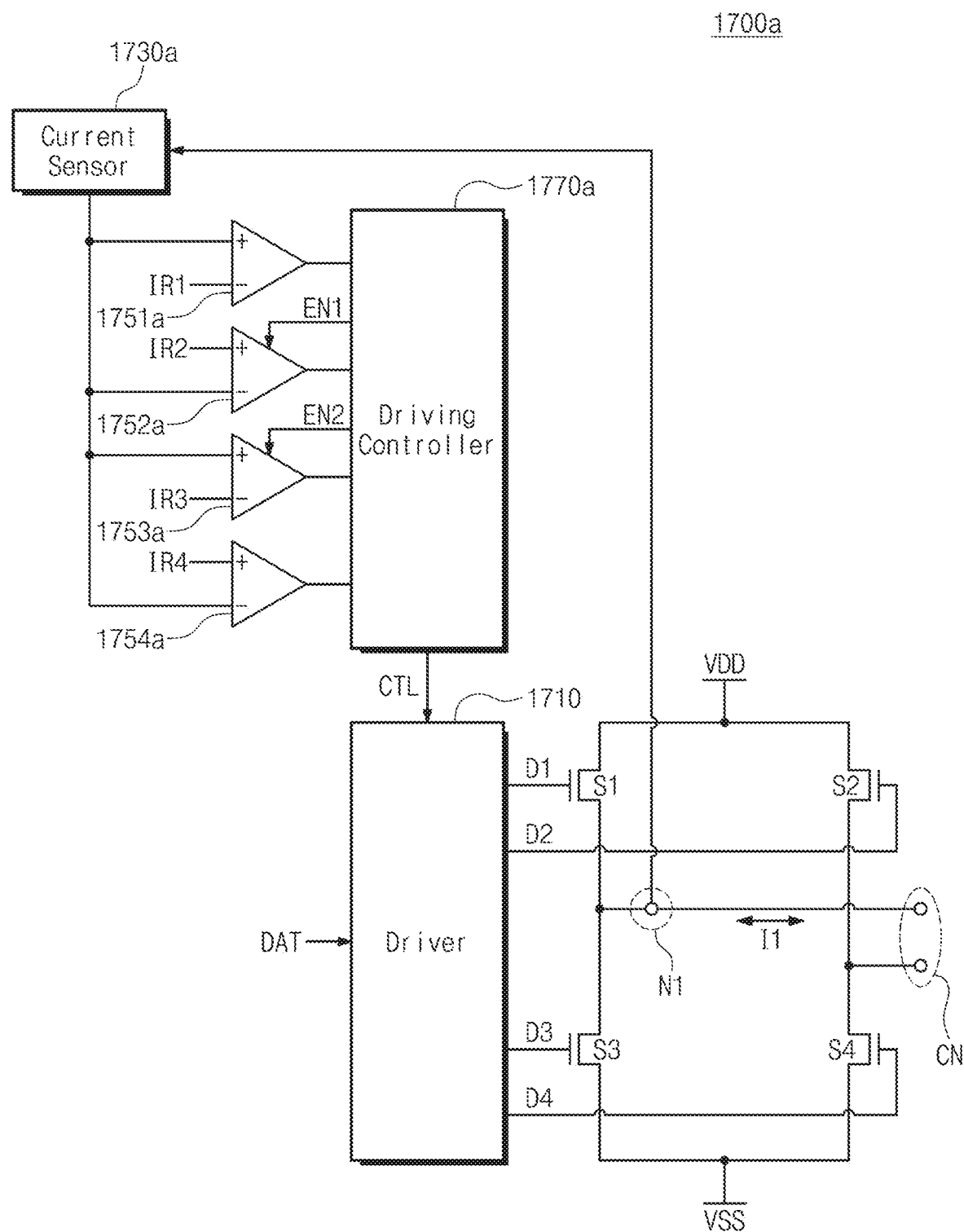
FIG. 11 is a block diagram illustrating the transmission circuit of FIG. 3 associated with the operations of FIG. 10 according to some embodiments of the inventive concepts.

FIG. 11 is a block diagram illustrating the transmission circuit of FIG. 3 associated with the operations of FIG. 10 according to some embodiments of the inventive concepts.

Referring to FIGS. 3, 10 and 11, in some embodiments, the transmission circuit 1700 of FIG. 3 may include a transmission circuit 1700a of FIG. 11. The transmission circuit 1700a may include the driver 1710, the switches S1, S2, S3, and S4, a current sensor 1730a, comparators 1751a, 1752a, 1753a, and 1754a, and a driving controller 1770a. For brevity, redundant descriptions of components described with reference to FIGS. 3 to 9 may be omitted below.

The current sensor 1730a may sense the level of the current I1 provided to the inductive element 1705. To this end, the current sensor 1730a may be connected to a node N1 connected to the inductive element 1705 through the connection nodes CN. The level sensed by the current sensor 1730a may be provided to the comparators 1751a, 1752a, 1753a, and 1754a.

The comparator 1751a may compare the sensed current level with the reference value IR1. Referring to FIGS. 10 and 11, the comparator 1751a may output a logic value corresponding to the comparison result. Accordingly, an output of the comparator 1751a may indicate whether the sensed current level is equal to or greater than the reference value IR1. For example, the comparator 1751a may output a second logic value (e.g., logic "1") during a specific time interval if the sensed current level is equal to or greater than the reference value IR1 (e.g., at a time point "t11"); otherwise, the comparator 1751a may output a first logic value (e.g., logic "0").

The comparator 1752a may compare the reference value IR2 with the sensed current level. Referring to FIGS. 10 and 11, the comparator 1752a may output a logic value corresponding to the comparison result. Accordingly, an output of the comparator 1752a may indicate whether the sensed current level is equal to or less than the reference value IR2. For example, the comparator 1752a may output the second logic value during a specific time interval if the sensed current level is equal to or less than the reference value IR2 (e.g., at a time point "t12"); otherwise, the comparator 1751a may output the first logic value.

When the comparator 1751a indicates that an intensity corresponding to the sensed current level is equal to or greater than the reference value IR1 for the first time in the first time interval, the comparator 1752a may be activated in response to the second logic value of an enable signal EN1. In addition, when the second time interval starts, the comparator 1752a may be deactivated in response to the first logic value of the enable signal EN1. Referring to FIGS. 10 and 11, the enable signal EN1 may be provided to the comparator 1752a to initiate and terminate an operation period of the comparator 1752a.

Similarly, an output of the comparator 1753a may indicate whether the sensed current level is equal to or greater than the reference value IR3, and an output of the comparator 1754a may indicate whether the sensed current level is less than the reference value IR4. When the comparator 1754a indicates that an intensity corresponding to the sensed current level is equal to or less than the reference value IR4 for the first time in the first time interval, the comparator 1753a may be activated in response to an enable signal EN2. When the second time interval starts, the comparator 1753a may be deactivated.

The driving controller 1770a may generate the control signal CTL based on the outputs of the comparators 1751a, 1752a, 1753a, and 1754a. In other words, the driving controller 1770a may generate the control signal CTL based on the level sensed by the current sensor 1730a. The control signal CTL may be generated to control the driver 1710. The driver 1710 may generate driving signals D1, D2, D3, and D4 based on the data DAT and the control signal CTL.

For example, the driving controller 1770a may generate the control signal CTL causing the driver 1710 to generate the driving signals D1, D2, D3, and D4 of FIG. 9 (or FIG. 8), based on the output of the comparator 1751a indicating that the level of the current I1 is equal to or greater than the reference value IR1. Accordingly, the intensity of the current I1 may decrease.

On the other hand, the driving controller 1770a may generate the control signal CTL which makes the driver 1710 generate the driving signals D1, D2, D3, and D4 of FIG. 7, based on the output of the comparator 1752a indicating that the level of the current I1 is equal to or less than the reference value IR2. Accordingly, the intensity of the current I1 may increase. In such a manner, an increase and a decrease in the level of the current I1 may be repeated alternately in the fourth time interval and the third time interval.

In addition, in the first time interval and the second time interval, the driving controller 1770a may generate the control signal CTL which makes the driver 1710 generate the driving signals D1, D2, D3, and D4 of FIG. 9 (or FIG. 8) and the driving signals D1, D2, D3, and D4 of FIG. 7 alternately. Accordingly, an increase and a decrease in the intensity of the current I1 may be alternately repeated while the intensity of the current I1 increases toward a target value over the whole first time interval and while the intensity of the current I1 decreases toward 0 (zero) over the whole second time interval.

Figure 12:
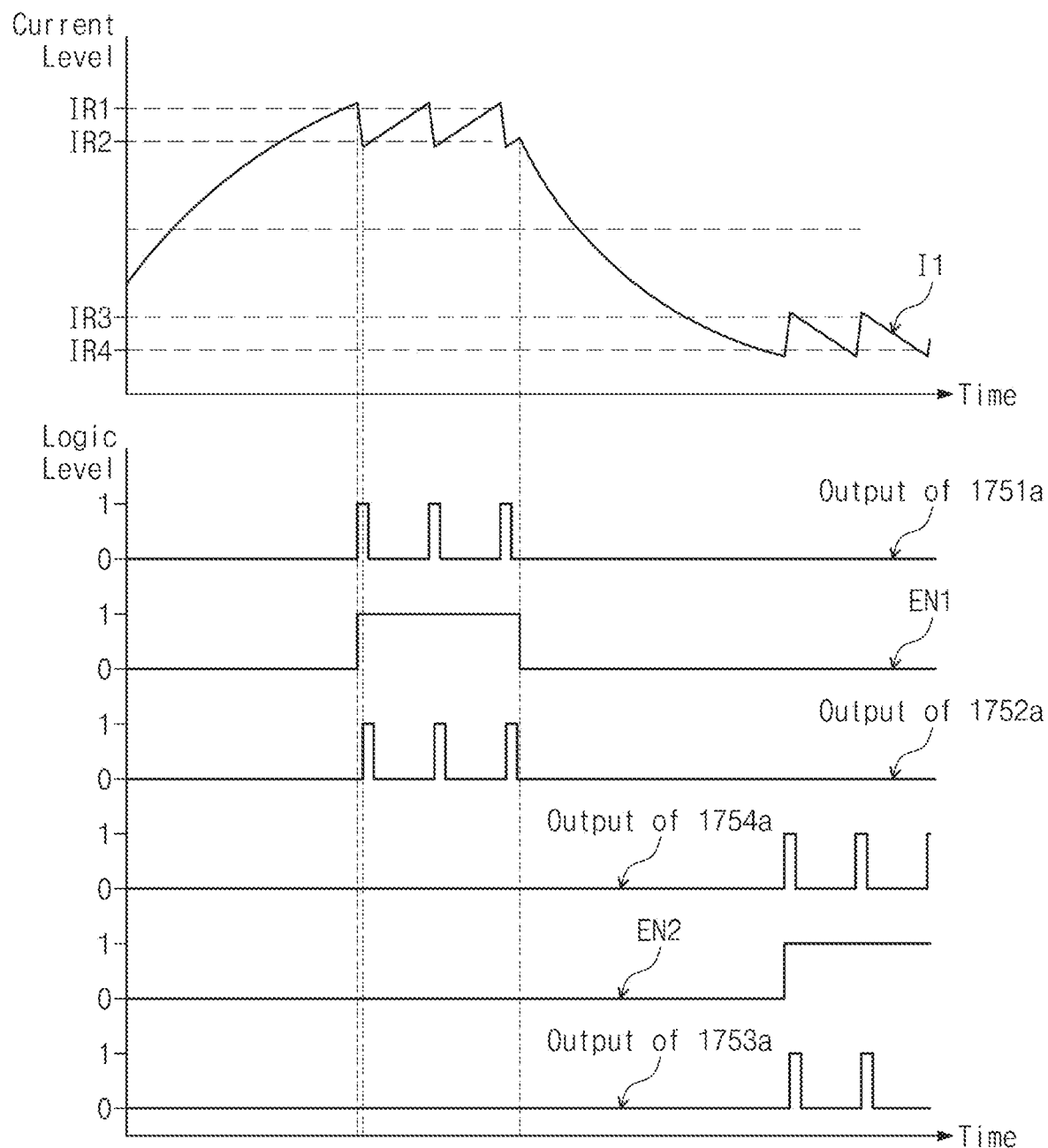
FIG. 12 is a timing diagram illustrating operations for adjusting a peak intensity of current in the transmission circuit of FIG. 11 according to some embodiments of the inventive concepts.

FIG. 12 is a timing diagram illustrating operations for adjusting a peak intensity of the current in the transmission circuit of FIG. 11 according to some embodiments of the inventive concepts.

Referring to FIG. 10, in some embodiments, while the intensity of the current I1 increases from 0 (zero) toward the target value and while the increased intensity of the current I1 decreases toward 0, an increase and a decrease in the intensity of the current I1 may be alternately repeated. However, in some embodiments, while the intensity of the current I1 increases from 0 toward the target value and while the increased intensity of the current I1 decreases toward 0, an increase and a decrease in the intensity of the current I1 may not be repeated. For example, referring to FIG. 12, while the intensity of the current I1 increases from 0 toward the target value and while the increased intensity of the current I1 decreases toward 0, the intensity of the current I1 may monotonically increase and/or may monotonically decrease.

In the transmission circuit 1700a of FIG. 11, when the output of the comparator 1751a indicates that the sensed current level of the current I1 is equal to or greater than the reference value IR1, the driving controller 1770a may generate the control signal CTL which makes the driver 1710 generate the driving signals D1, D2, D3, and D4 of FIG. 9 (or FIG. 8). Accordingly, the intensity of the current I1 may decrease.

On the other hand, when the output of the comparator 1751a indicates that the sensed current level of the current I1 is equal to or less than the reference value IR2, the driving controller 1770a may generate the control signal CTL which makes the driver 1710 generate the driving signals D1, D2, D3, and D4 of FIG. 7. Accordingly, the intensity of the current I1 may increase.

In such a manner, an increase and a decrease in the intensity of the current I1 may be alternately repeated, and the intensity of the current I1 may maintain in a current level range associated with the reference values IR1 and IR2 without exceeding the target value. Descriptions associated with the reference values IR3 and IR4 may be omitted below for brevity.

Figure 13:
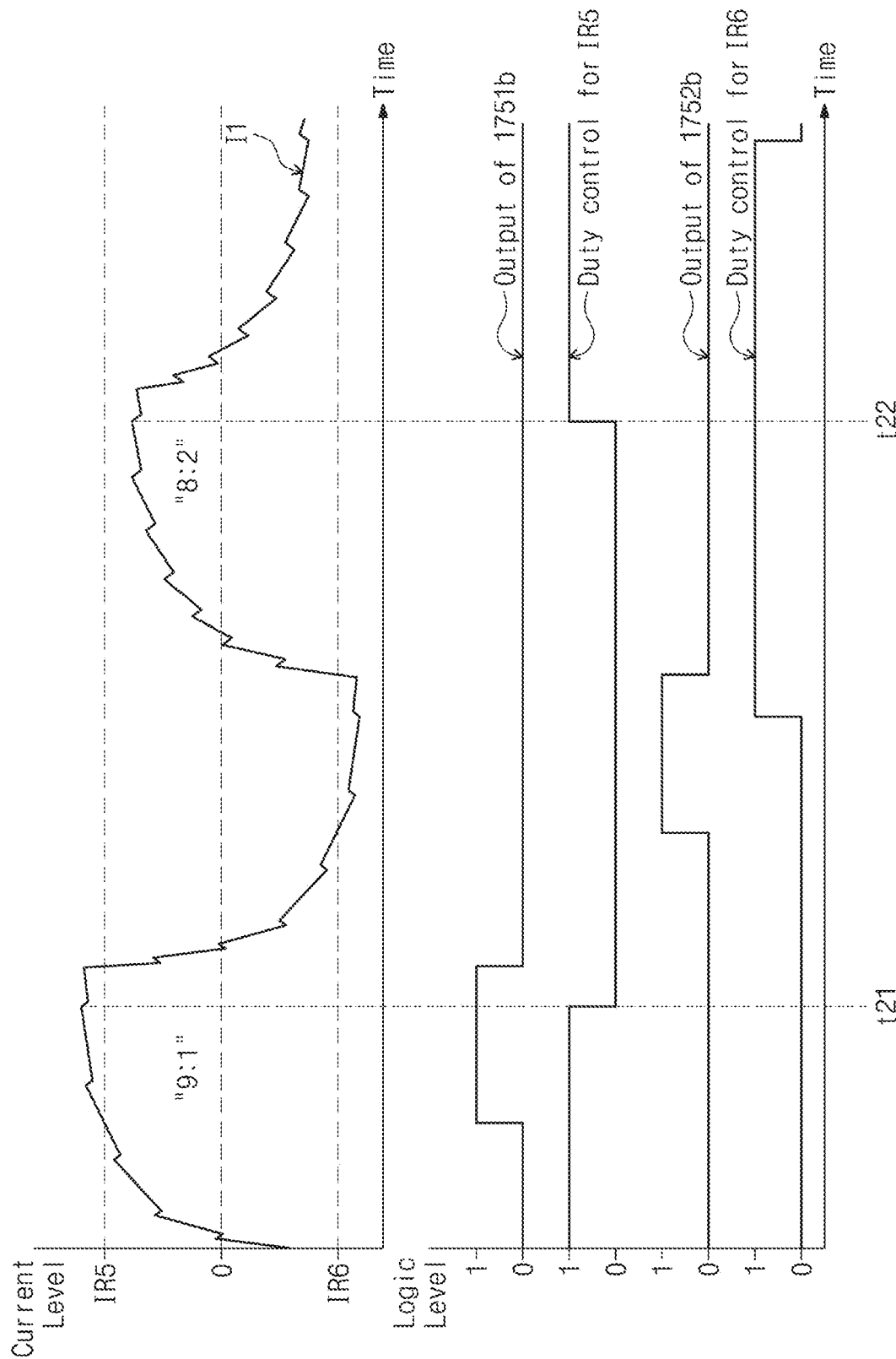
FIGS. 13 and 14 are timing diagrams illustrating operations for adjusting a peak intensity of current in the transmission circuit of FIG. 3 according to some embodiments of the inventive concepts.
Figure 14:
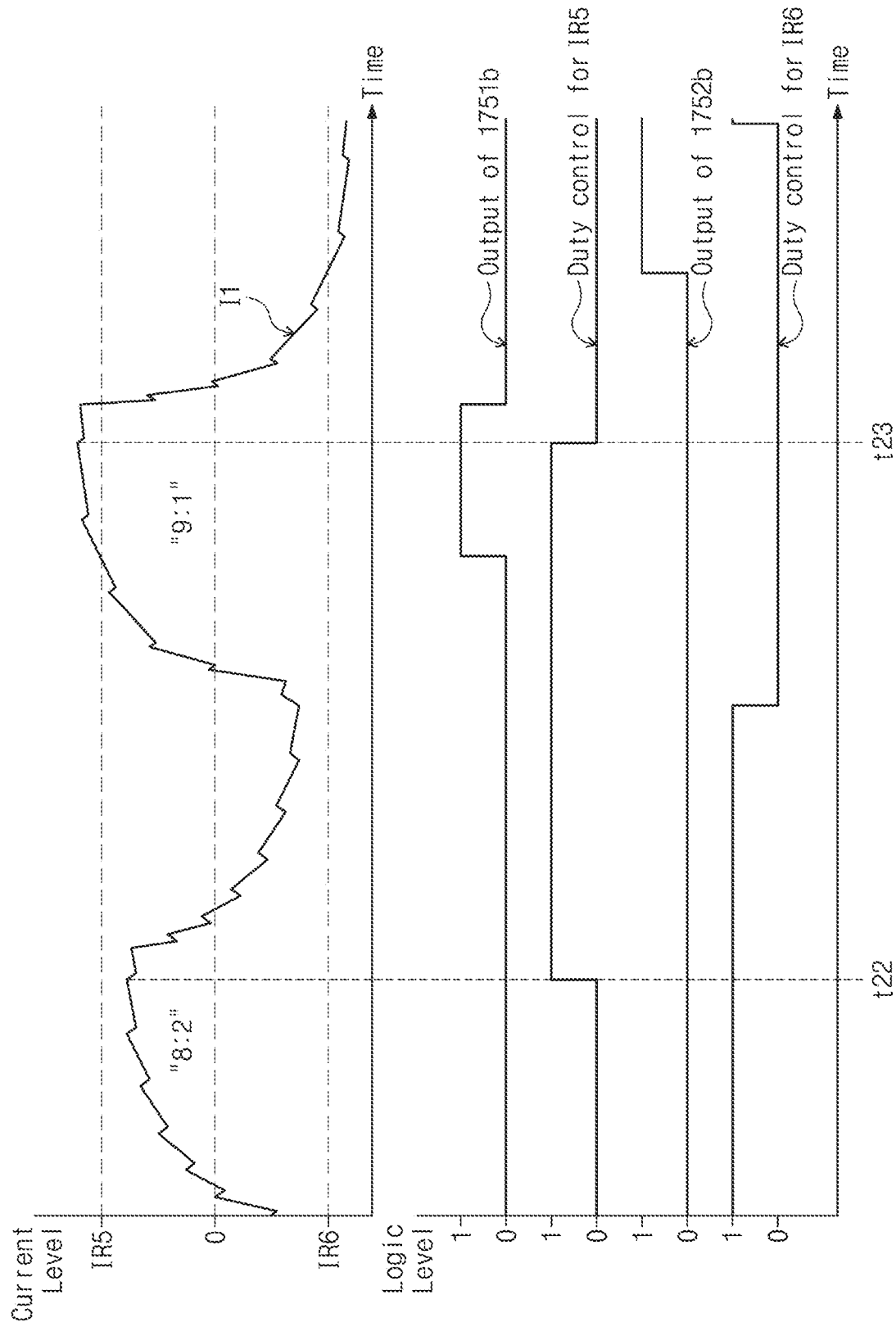

FIGS. 13 and 14 are timing diagrams illustrating operations for adjusting a peak intensity of the current in the transmission circuit of FIG. 3 according to some embodiments of the inventive concepts. To facilitate better understanding, FIGS. 13 and 14 may be referred to together.

As described above, the level of the current I1 may vary between a positive target level (e.g., +I1T) and a negative target level (e.g., −I1T). In addition, during a first time interval (e.g., TV1) in which the intensity of the current I1 increases from 0 (zero) toward the target value and during a second time interval (e.g., TV2) in which the increased intensity of the current I1 decreases toward 0, an increase and a decrease in the intensity of the current I1 may be alternately repeated.

For example, in the first time interval, a first increase (e.g., IV1 of FIG. 6) and a first decrease (e.g., DV1 of FIG. 6) in the intensity of the current I1 may be alternately repeated. Herein, a duty ratio of a first time length for the first increase to a second time length for the first decrease may affect the peak intensity of the current I1. In other words, how long the first increase maintains and how long the first decrease maintains may affect the peak intensity of the current I1.

For example, as the duty ratio becomes greater (i.e., as the first time length become longer and the second time length become shorter), the intensity of the current I1 may increase during a longer time, and thus the peak intensity of the current I1 may increase. On the other hand, as the duty ratio becomes smaller (i.e., as the first time length become shorter and the second time length become longer), the intensity of the current I1 may increase during only a shorter time, and thus the peak intensity of the current I1 may decrease.

Accordingly, in some embodiments, the transmission circuit 1700 may adjust the duty ratio to adjust the peak intensity of the current I1. The transmission circuit 1700 may adjust the first time length and the second time length to adjust the duty ratio.

In some embodiments, the transmission circuit 1700 may compare the level of the current I1 with each of reference values IR5 and IR6. The reference value IR5 may be associated with a positive level, and the reference value IR6 may be associated with a negative level. For example, the transmission circuit 1700 may detect whether the level of the current I1 is greater than the reference value IR5, and may detect whether the level of the current I1 is less than the reference value IR6.

For example, when a maximum value of the intensity of the current I1 is greater than the reference value IR5 in the first time interval, the transmission circuit 1700 may adjust the first time length and the second time length (e.g., may decrease the first time length and may increase the second time length) such that the duty ratio decreases (i.e., such that the peak intensity of the current I1 decreases) in the following first time interval. For example, referring to FIG. 13, the transmission circuit 1700 may decrease the duty ratio (e.g., from "9:1" to "8:2") in response to detecting that the maximum value of the intensity of the current I1 is greater than the reference value IR5 at a time point "t21". Accordingly, in the following first time interval, the first time length may decrease and the second time length may increase, and the maximum value of the intensity of the current I1 may decrease to be equal to or less than the reference value IR5 at a time point "t22".

On the other hand, when the maximum value of the intensity of the current I1 is less than the reference value IR5 in the first time interval, the transmission circuit 1700 may adjust the first time length and the second time length (e.g., may increase the first time length and may decrease the second time length) such that the duty ratio increases (i.e., such that the peak intensity of the current I1 increases) in the following first time interval. For example, referring to FIG. 14, the transmission circuit 1700 may increase the duty ratio (e.g., from "8:2" to "9:1") in response to detecting that the maximum value of the intensity of the current I1 is less than the reference value IR5 at a time point "t22". Accordingly, in the following first time interval, the first time length may increase and the second time length may decrease, and the maximum value of the intensity of the current I1 may increase to be equal to or greater than the reference value IR5 at a time point "t23".

For example, the reference value IR5 may be selected to be equal to or less than the target value (e.g., "I1T"). In this example, the intensity of the current I1 may not exceed the target value. In addition, the intensity of the current I1 may be prevented from being excessively small. The reference value IR5 may be suitably selected taking into account power consumption and stable communication.

The duty ratio described with reference to FIGS. 13 to 14 is provided to facilitate better understanding, and is not intended to limit embodiments of the inventive concepts. The duty ratio may be variously changed or modified such that the intensity of the current I1 does not exceed the target value. In some cases, the duty ratio may successively increase or decrease depending on the maximum value of the intensity of the current I1 and the reference value IR5. In some cases, when the maximum value of the intensity of the current I1 is identical to the reference value IR5, the duty ratio may maintain a constant value.

Similarly, referring to FIG. 13, when the minimum value of the level of the current I1 is less than the reference value IR6 in the first time interval, the transmission circuit 1700 may adjust the first time length and the second time length (e.g., may increase the first time length and may decrease the second time length) such that the duty ratio increases (i.e., the peak intensity of the current I1 decreases) in the following first time interval. On the other hand, referring to FIG. 14, when the minimum value of the level of the current I1 is greater than the reference value IR6 in the first time interval, the transmission circuit 1700 may adjust the first time length and the second time length (e.g., may decrease the first time length and may increase the second time length) such that the duty ratio decreases (i.e., the peak intensity of the current I1 increases) in the following first time interval.

Figure 15:
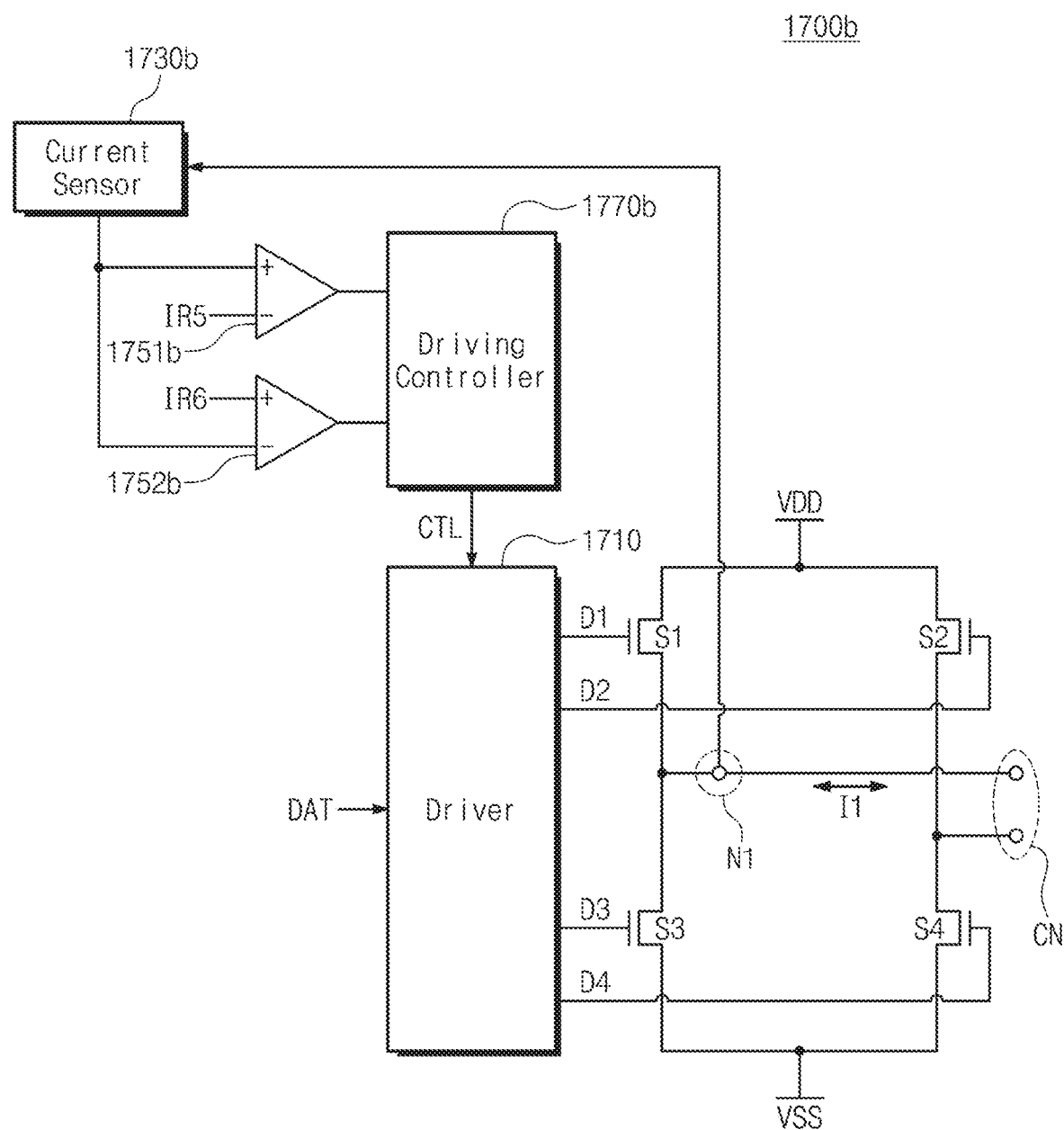
FIG. 15 is a block diagram illustrating the transmission circuit of FIG. 3 associated with operations of FIGS. 13 and 14 according to some embodiments of the inventive concepts.

FIG. 15 is a block diagram illustrating the transmission circuit of FIG. 3 associated with the operations of FIGS. 13 and 14 according to some embodiments of the inventive concepts.

Referring to FIGS. 3, 13, 14, and 15, in some embodiments, the transmission circuit 1700 of FIG. 3 may include a transmission circuit 1700b of FIG. 15. The transmission circuit 1700b may include the driver 1710, the switches S1, S2, S3, and S4, a current sensor 1730b, comparators 1751b and 1752b, and a driving controller 1770b. For brevity, redundant descriptions of components described with reference to FIGS. 3 to 9 may be omitted below.

The current sensor 1730b may be connected to the node N1 to sense the level of the current I1 provided to the inductive element 1705. The current level sensed by the current sensor 1730b may be provided to the comparators 1751b and 1752b.

The comparator 1751b may compare the sensed current level with the reference value IR5. Referring to FIGS. 13 and 14, the comparator 1751b may output a logic value corresponding to the comparison result. Accordingly, an output of the comparator 1751b may indicate whether the sensed current level is greater than the reference value IR5. For example, the comparator 1751b may output a second logic value (e.g., logic "1") if the sensed current level is greater than the reference value IR5; otherwise, the comparator 1751b may output a first logic value (e.g., logic "0").

The driving controller 1770b may generate the control signal CTL based on the output of the comparator 1751b. In other words, the driving controller 1770b may generate the control signal CTL based on the level sensed by the current sensor 1730b. The driver 1710 may generate the driving signals D1, D2, D3, and D4 based on the data DAT and the control signal CTL.

For example, based on the comparison result of the comparator 1751b indicating that a maximum value of the intensity of the current I1 is greater than the reference value IR5, the driving controller 1770b may generate the control signal CTL such that the duty ratio decreases in the following first time interval. Accordingly, in the following first time interval, the first time length for the first increase may decrease and the second time length for the first decrease may increase, and thus the peak intensity of the current I1 may decrease.

On the other hand, based on the comparison result of the comparator 1751b indicating that the maximum value of the intensity of the current I1 is less than the reference value IR5, the driving controller 1770b may generate the control signal CTL such that the duty ratio increases in the following first time interval. Accordingly, in the following first time interval, the first time length may increase and the second time length may decrease, and thus the peak intensity of the current I1 may increase.

For example, the control signal CTL may include a bit value to be referenced to control the duty ratio. Referring to FIGS. 13 and 14, the bit value may have a first logic value for decreasing the duty ratio of the following first time interval and a second logic value for increasing the duty ratio of the following first time interval. In some embodiments, the driving controller 1770b may include a register or another type of memory to store the bit value of the control signal CTL.

Based on the bit value, the first time length for generating the driving signals D1, D2, D3, and D4 of FIG. 7 and the second time length for generating the driving signals D1, D2, D3, and D4 of FIG. 9 (or FIG. 8) may be adjusted or changed. In such a manner, the duty ratio of the first time length to the second time length may be adjusted, and thus the peak intensity of the current I1 may be adjusted.

Similarly, an output of the comparator 1752b may indicate whether the sensed current level is less than the reference value IR6. The driving controller 1770b may generate the control signal CTL based on the comparison result of the comparator 1752b. On the basis of whether a minimum value of the level of the current I1 is less than the reference value IR6, the driving controller 1770b may generate the control signal CTL such that the duty ratio increases or decreases. The driver 1710 may generate the driving signals D1, D2, D3, and D4 based on the control signal CTL such that the first time length and the second time length are changed.

FIG. 16 is a table indicating a peak intensity of the current adjusted in the transmission circuit of FIG. 3 according to some embodiments of the inventive concepts. Below, the voltage values, resistance values, and current values will be described with reference to FIG. 16, but these values are provided to facilitate better understanding and are not intended to limit the inventive concepts. Values may be variously changed or modified depending on implementation of the transmission circuit 1700.

For example, a resistance value of the resistance component R of the inductive element 1705 may be 1.80Ω. When a maximum value of a voltage value of the supply voltage VDD is 4.40 V, a maximum intensity "I1M" of the current I1 may be 2.44 A. However, when a voltage value of the supply voltage VDD is great and the intensity of the current I1 is great, a large amount of power may be consumed.

Accordingly, for example, the target value "I1T" of the intensity of the current I1 may be selected as 2.00 A. According to the embodiments described with reference to FIGS. 6 to 15, the peak intensity of the current I1 may be adjusted to be equal to or less than the target value "I1T". According to some embodiments, power consumption due to the current I1 may decrease when the supply voltage VDD is high.

As described above, the target value "I1T" may be suitably selected taking into account power consumption and stable communication. For example, the target value "I1T" may be smaller than a value (e.g., a maximum intensity "I1M" of 2.44 A) obtained by dividing a maximum voltage value (e.g., 4.40 V) of the supply voltage VDD by a resistance value (e.g., 1.80Ω) of the resistance component R of the inductive element 1705.

When the battery voltage decreases as a battery is discharged, a voltage value of the supply voltage VDD may also decrease. For example, when the supply voltage VDD decreases to 4.00 V or 3.60 V, the maximum intensity "I1M" of the current I1 may be 2.22 A or 2.00 A. When the maximum intensity "I1M" is equal to or greater than the target value "I1T", the intensity of the current I1 may be adjusted (e.g., limited) to the target value "I1T" of 2.00 A. Accordingly, power consumption due to the current I1 may be prevented from increasing.

When the battery voltage further decreases, the supply voltage VDD may decrease to 3.20 V or 2.80 V. In this case, the maximum intensity "I1M" of the current I1 may be 1.78 A or 1.56 A. When the maximum intensity "I1M" is less than the target value "I1T", the intensity of the current I1 may correspond to a value obtained by dividing a voltage value of the supply voltage VDD by a resistance value of the resistance component R of the inductive element 1705. That is to say, the current I1 may be generated without adjusting (e.g., limiting) the intensity. For example, the current I1 may be generated without alternate repetition of an increase and a decrease in the intensity.

Figure 17:
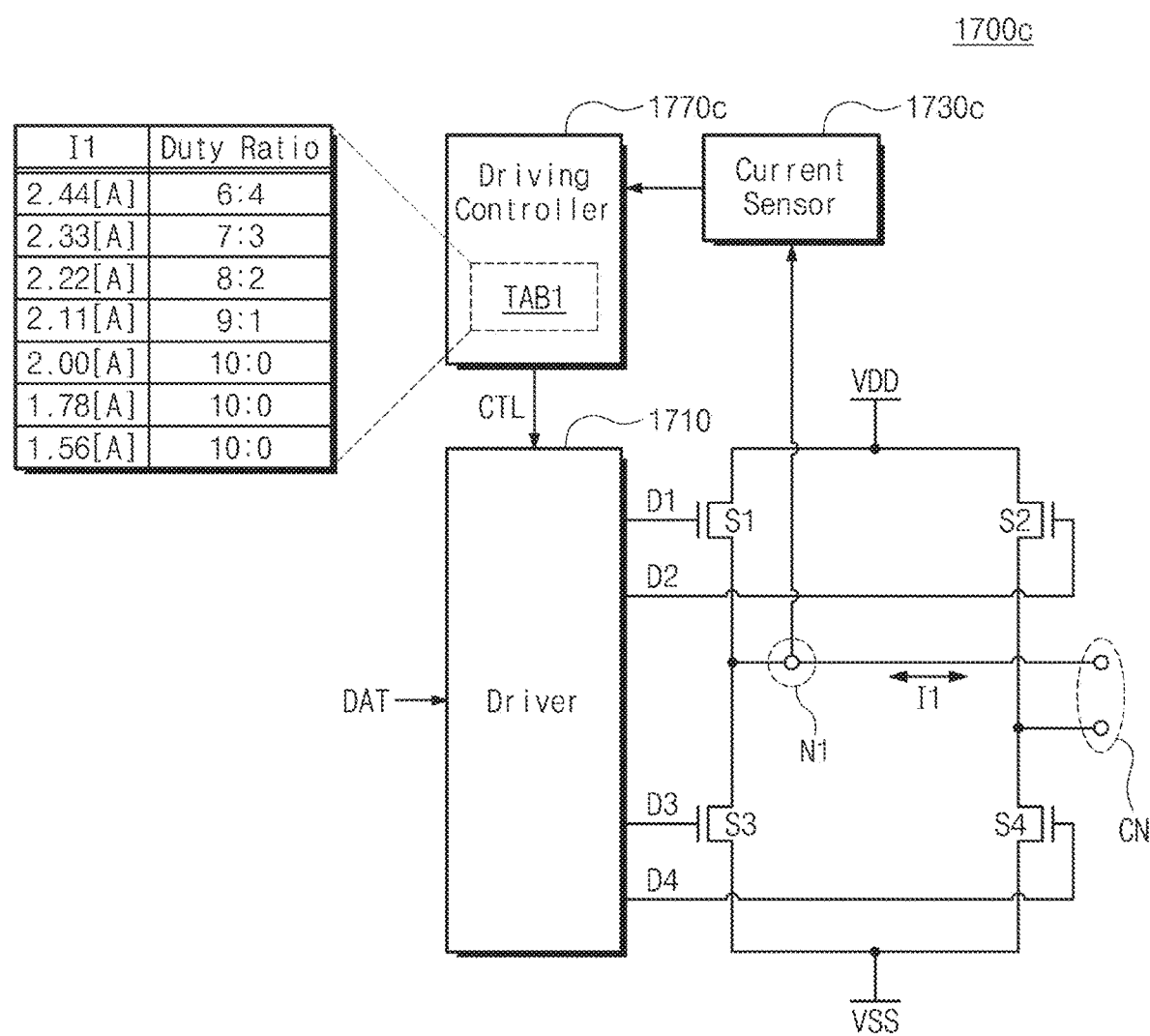
FIGS. 17 to 20 are block diagrams illustrating the transmission circuit of FIG. 3 according to some embodiments of the inventive concepts.

FIG. 17 is a block diagram illustrating the transmission circuit of FIG. 3 according to some embodiments of the inventive concepts.

In some embodiments, the transmission circuit 1700 of FIG. 3 may include a transmission circuit 1700c of FIG. 17. The transmission circuit 1700c may include the driver 1710, the switches S1, S2, S3, and S4, a current sensor 1730c, and a driving controller 1770c. For brevity, redundant descriptions of components described with reference to FIGS. 3 to 9 may be omitted below.

The current sensor 1730c may be connected to the node N1 to sense the level of the current I1 provided to the inductive element 1705. The current level sensed by the current sensor 1730c may be provided to the driving controller 1770c.

The driving controller 1770c may manage correspondence information TAB1. The correspondence information TAB1 may be associated with a correspondence relationship between levels of the current I1 and values of the duty ratio. The driving controller 1770c may include a look-up table or another type of memory to manage the correspondence information TAB1.

The driving controller 1770c may obtain a duty ratio corresponding to the level sensed by the current sensor 1730c, with reference to the correspondence information TAB1. The driving controller 1770c may generate the control signal CTL based on the obtained duty ratio. The driver 1710 may generate the driving signals D1, D2, D3, and D4 based on the data DAT and the control signal CTL.

The driving controller 1770b and the driving controller 1770c may control the duty ratio of the first time length for the first increase of the first time interval to the second time length for the first decrease of the first time interval. In the embodiments described with reference to FIGS. 13 to 15, the driving controller 1770b may generate the control signal CTL such that the duty ratio is gradually or stepwise adjusted. In the embodiments of FIG. 17, the driving controller 1770c may generate the control signal CTL such that the duty ratio is changed and set to the duty ratio value obtained from the correspondence information TAB1.

For example, when the level of the current I1 sensed by the current sensor 1730c is 2.22 A, the driving controller 1770c may generate the control signal CTL such that the duty ratio is changed and set to 8:2. The driver 1710 may generate the driving signals D1, D2, D3, and D4 such that the duty ratio becomes 8:2. When it is sensed that the level of the current I1 is equal to or less than 2.00 A (which is the target value "I1T"), the duty ratio may be changed and set to 10:0 (i.e., the current I1 may be generated without alternate repetition of an increase and a decrease in the intensity).

Figure 18:
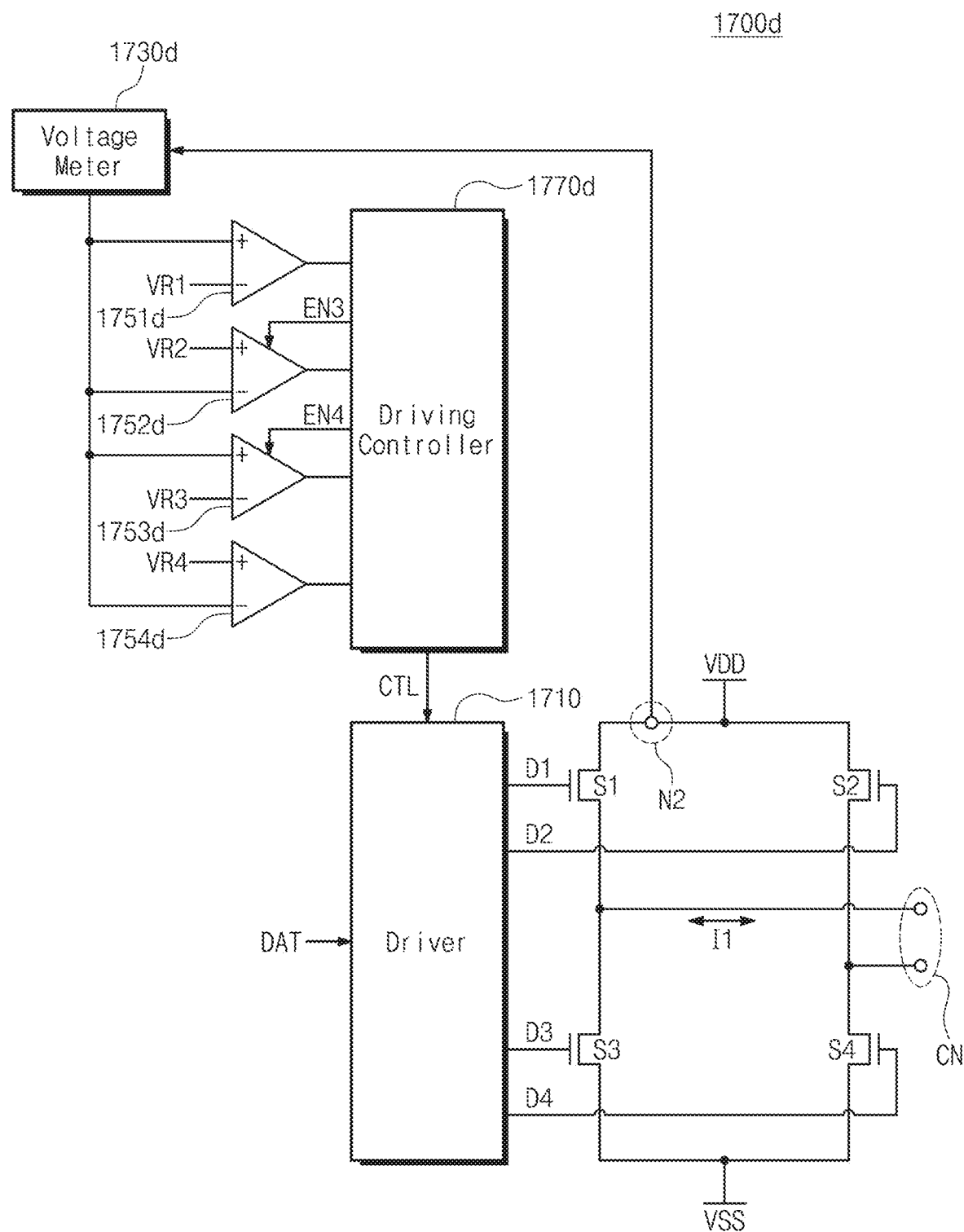
Figure 19:
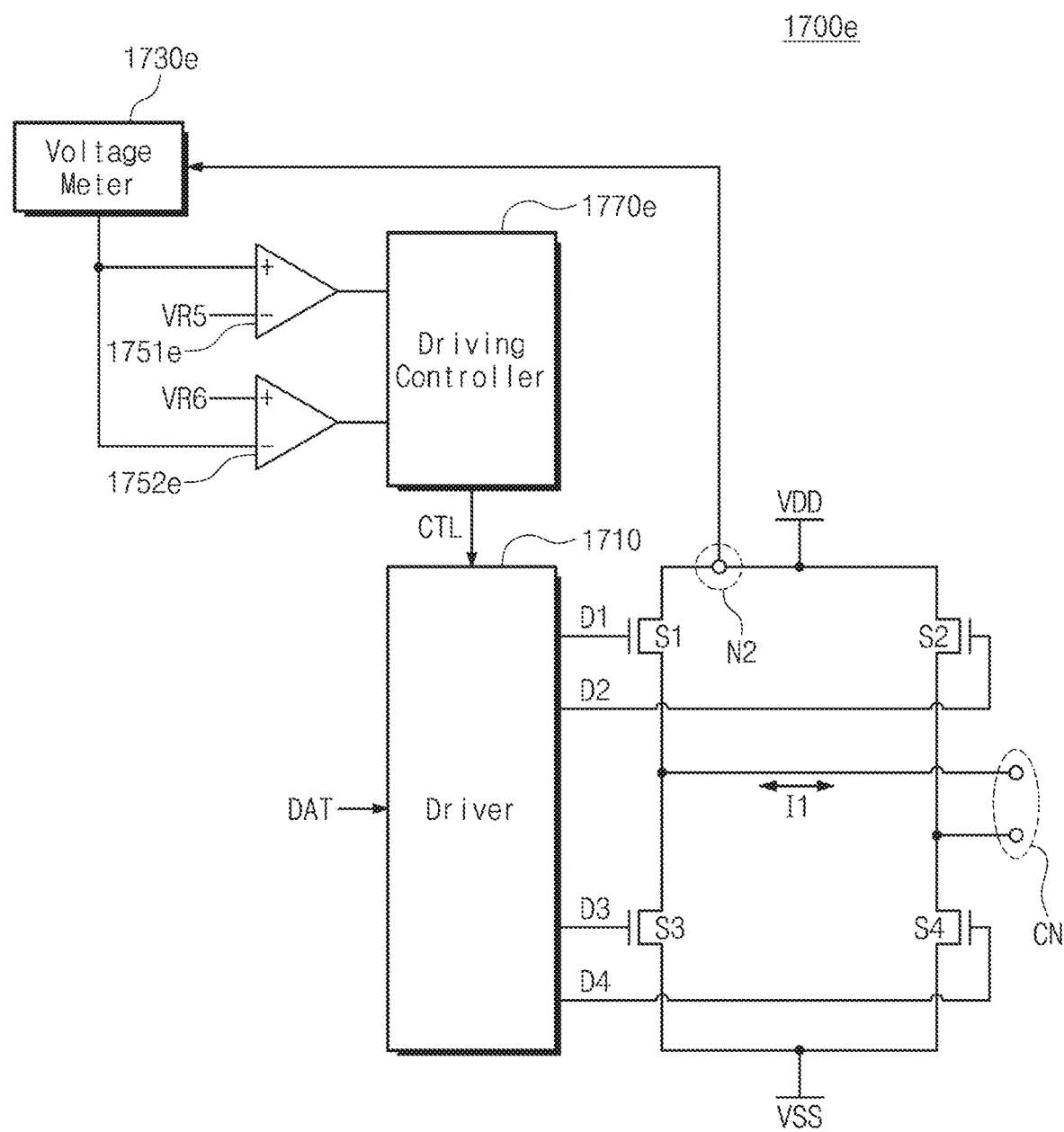
Figure 20:
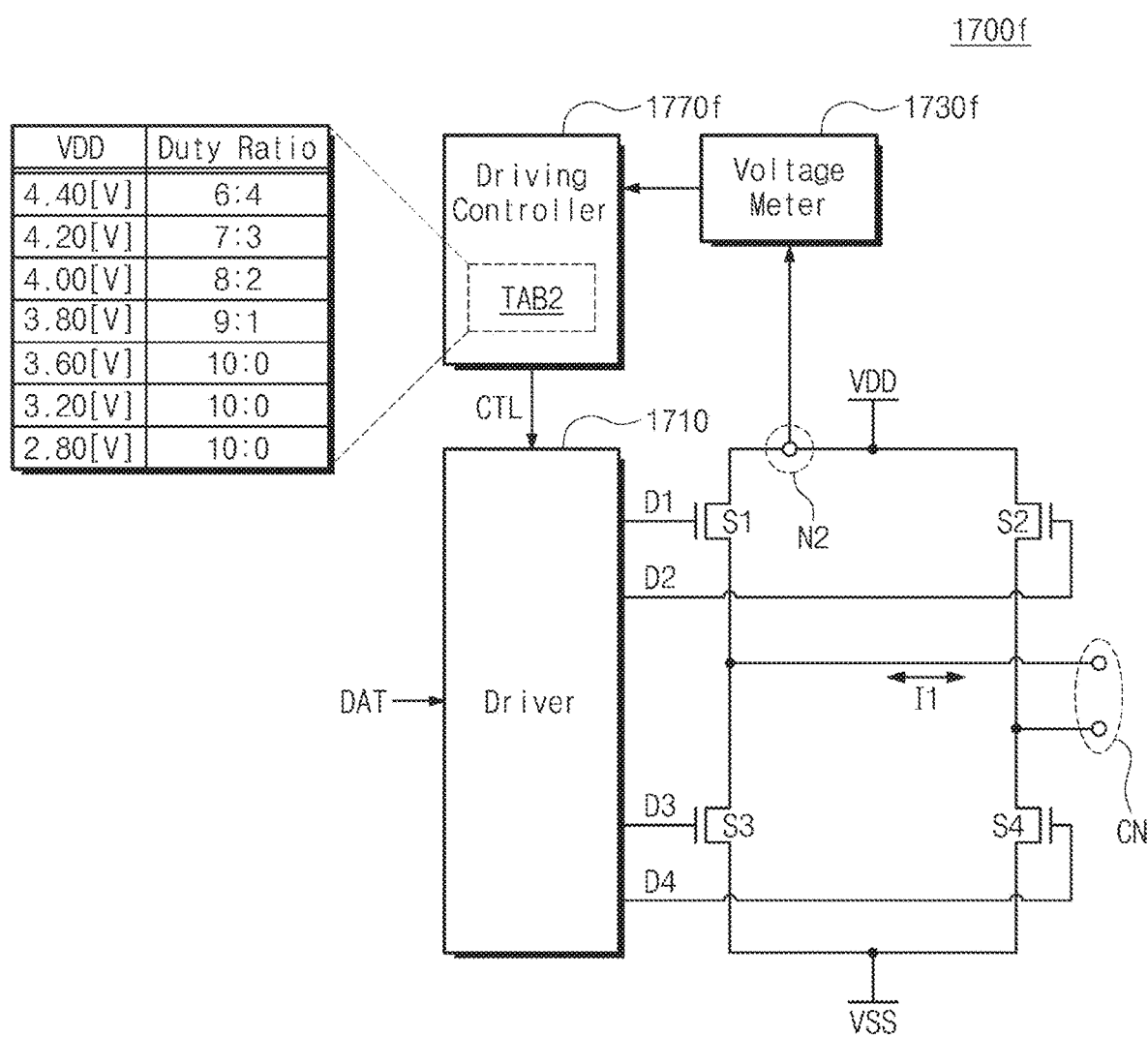

FIGS. 18 to 20 are block diagrams illustrating the transmission circuit of FIG. 3 according to some embodiments of the inventive concepts.

Referring to FIGS. 3 and 18, 19, and 20, in some embodiments, the transmission circuit 1700 of FIG. 3 may include a transmission circuit 1700d of FIG. 18, a transmission circuit 1700e of FIG. 19, or a transmission circuit 1700f of FIG. 20. For brevity, redundant descriptions of components described with reference to FIGS. 3 to 9 may be omitted below.

Referring to FIGS. 18 to 20, the transmission circuits 1700d, 1700e, and 1700f may include voltage meters 1730d, 1730e, and 1730f. Each of the voltage meters 1730d, 1730e, and 1730f may measure a level of the supply voltage VDD received by the switches S1, S2, S3, and S4. To this end, each of the voltage meters 1730d, 1730e, and 1730f may be connected to a node N2 to which the supply voltage VDD is applied.

Referring to FIG. 18, the transmission circuit 1700d may include the driver 1710, the switches S1, S2, S3, and S4, the voltage meter 1730d, comparators 1751d, 1752d, 1753d, and 1754d, and a driving controller 1770d. The comparator 1751d may compare the level measured by the voltage meter 1730d with a reference value VR1, and the comparator 1752d may compare a reference value VR2 with the measured level. The comparator 1753d may compare the measured level with a reference value VR3, and the comparator 1754d may compare a reference value VR4 with the measured level. The driving controller 1770d may provide an enable signal EN3 to the comparator 1752d based on an output of the comparator 1751d, and may provide an enable signal EN4 to the comparator 1753d based on an output of the comparator 1754d. The driving controller 1770d may provide the control signal CTL to the driver 1710 based on outputs of the comparators 1751d, 1752d, 1753d, and 1754d (i.e., based on the level measured by the voltage meter 1730d).

Referring to FIG. 19, the transmission circuit 1700e may include the driver 1710, the switches S1, S2, S3, and S4, the voltage meter 1730e, comparators 1751e and 1752e, and a driving controller 1770e. The comparator 1751e may compare the level measured by the voltage meter 1730e with a reference value VR5, and the comparator 1752e may compare a reference value VR6 with the measured level. The driving controller 1770e may provide the control signal CTL to the driver 1710 based on outputs of the comparators 1751e and 1752e (i.e., based on the level measured by the voltage meter 1730e).

Referring to FIG. 20, the transmission circuit 1700f may include the driver 1710, the switches S1, S2, S3, and S4, the voltage meter 1730f, and a driving controller 1770f. The driving controller 1770f may manage correspondence information TAB2 associated with a correspondence relationship between levels of a voltage and values of a duty ratio. The driving controller 1770f may provide the control signal CTL to the driver 1710 based on an output of the voltage meter 1730f and the correspondence information TAB2.

The embodiments of FIG. 18 may be associated with the embodiments described with reference to FIGS. 10 to 12. The embodiments of FIG. 19 may be associated with the embodiments described with reference to FIGS. 13 to 15. The embodiments of FIG. 20 may be associated with the embodiments described with reference to FIG. 17.

The embodiments of FIGS. 18 to 20 may be implemented to control an increase and a decrease in the intensity of the current I1 based on the level of the supply voltage VDD instead of the level of the current I1. It may be understood from FIG. 16 that the intensity of the current I1 may be associated with the level of the supply voltage VDD. Accordingly, it may be readily understood that the embodiments of FIGS. 18 to 20 are implemented by modifying the embodiments of FIGS. 10 to 17.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above descriptions are intended to provide some configurations and operations for implementing the inventive concepts. The scope and spirit of the inventive concepts may include implementations which are obtained by changing or modifying the above embodiments, in addition to the above-described embodiments.

What is claimed is:

1. An electronic device comprising:
    an inductive element configured to generate a wireless communication signal based on a current; and
    a transmission circuit configured to:
        output the current based on a supply voltage;
        increase an intensity of the current, from zero to an increased intensity that is less than or equal to a target value, by alternately repeating a first increase of the intensity of the current and a first decrease of the intensity of the current, in a first time interval; and
        decrease the intensity of the current, from the increased intensity to zero, by alternately repeating a second increase of the intensity of the current and a second decrease of the intensity of the current, in a second time interval.

2. The electronic device of claim 1,
    wherein an amount by which the intensity of the current increases during the first increase is greater than an amount by which the intensity of the current decreases during the first decrease, and
    wherein an amount by which the intensity of the current increases during the second increase is less than an amount by which the intensity of the current decreases during the second decrease.

3. The electronic device of claim 1,
    wherein the second time interval immediately follows the first time interval, and
    wherein the first time interval and the second time interval are alternately repeated.

4. The electronic device of claim 1, wherein the target value is less than a value obtained by dividing a maximum voltage value of the supply voltage by a resistance value of a resistance component of the inductive element.

5. The electronic device of claim 1,
    wherein the first time interval includes a third time interval and a fourth time interval, and
    wherein the transmission circuit is further configured to:
        decrease the intensity of the current, in the third time interval, in response to the intensity of the current being equal to or greater than a first reference value, the first reference value being equal to or less than the target value; and
        increase the intensity of the current, in the fourth time interval, in response to the intensity of the current being equal to or less than a second reference value, the second reference value being less than the first reference value.

6. The electronic device of claim 5, wherein the third time interval and the fourth time interval are alternately repeated between a first instance in the first time interval of the intensity of the current becoming equal to or greater than the first reference value and a beginning of the second time interval.

7. The electronic device of claim 1, wherein the transmission circuit is further configured to adjust a duty ratio of a first time length for the first increase to a second time length for the first decrease.

8. The electronic device of claim 7, wherein the transmission circuit is further configured to change the first time length and/or the second time length to decrease the duty ratio in a following first time interval based on a determination that a maximum value of the intensity of the current is greater than a third reference value in the first time interval.

9. The electronic device of claim 8, wherein the transmission circuit is further configured to change the first time length and/or the second time length to increase the duty ratio in the following first time interval based on a determination that a maximum value of the intensity of the current is less than the third reference value in the first time interval.

10. The electronic device of claim 1, wherein the transmission circuit is further configured to:
    limit the intensity of the current to the target value based on a voltage value of the supply voltage divided by a resistance value of a resistance component of the inductive element being greater than the target value; and
    refrain from limiting the intensity of the current based on the voltage value of the supply voltage divided by the resistance value of the resistance component of the inductive element being equal to or less than the target value.

11. An electronic device comprising:
    a transmission circuit comprising a driver and a plurality of switches, the driver being configured to generate a plurality of driving signals based on data and a control signal, the plurality of switches being configured to provide paths for outputting a current in response to the plurality of driving signals; and
    an inductive element configured to perform wireless communication corresponding to the data with an external device by receiving the current from the switches and generating an output signal based on the current,
    wherein the driver is configured to vary a level of the current corresponding to values of the data, and
    wherein the driver is further configured to generate the plurality of driving signals such that a first increase of an intensity of the current and a first decrease of the intensity of the current are alternately repeated in a first time interval to increase the intensity of the current from zero to an increased intensity that is less than or equal to a target value, and such that a second increase of the intensity of the current and a second decrease of the intensity of the current are alternately repeated in a second time interval to decrease the intensity of the current from the increased intensity to zero.

12. The electronic device of claim 11,
    wherein the driver is configured to vary the level of the current in a first transition from a first target level to a second target level and in a second transition from the second target level to the first target level,
    wherein the driver is configured to perform the second transition after a reference time interval after the first transition based on a value of the data being a first logic value, and
    wherein the driver is configured to perform the second transition within the reference time interval after the first transition based on a value of the data being a second logic value.

13. The electronic device of claim 11, wherein the switches comprise:
    a first switch including a first end connected to a first driving voltage and a second end connected to a first end of the inductive element;
    a second switch including a first end connected to the first driving voltage and a second end connected to a second end of the inductive element;

a third switch including a first end connected to the first end of the inductive element and a second end connected to a second driving voltage; and a fourth switch including a first end connected to the second end of the inductive element and a second end connected to the second driving voltage.

14. The electronic device of claim 13, wherein the driver is configured to generate the first decrease by configuring the plurality of driving signals to turn on the first switch and the second switch and to turn off the third switch and the fourth switch, such that the current flows from the second end of the inductive element to the first end of the inductive element through a path along the second switch, the inductive element, and the first switch.

15. The electronic device of claim 11, further comprising:
a current sensor configured to sense the level of the current provided to the inductive element; and
a driving controller configured to generate the control signal based on the sensed level.

16. The electronic device of claim 15, further comprising:
a first comparator configured to compare the sensed level of the current with a first reference value; and
a second comparator configured to compare a second reference value with the sensed level of the current,
wherein the driving controller is configured to activate the second comparator based on the first comparator indicating that the intensity of the current is equal to or greater than the first reference value for a first time in the first time interval.

17. The electronic device of claim 15, further comprising:
a comparator configured to compare the sensed level of the current with a reference value,
wherein the driving controller is configured to generate the control signal based on an output of the comparator, and
wherein the driver is configured to generate the plurality of driving signals such that a duty ratio of a first time length for the first increase to a second time length for the first decrease is adjusted based on the output of the comparator.

18. The electronic device of claim 15,
wherein the driving controller is further configured to determine a duty ratio corresponding to the sensed level based on information associated with a correspondence relationship between levels of the current and values of a duty ratio and generate the control signal based on the determined duty ratio, and
wherein the driver is configured to generate the plurality of driving signals such that a duty ratio of a first time length for the first increase to a second time length for the first decrease is equal to the determined duty ratio.

19. The electronic device of claim 11, further comprising:
a voltage meter configured to measure a level of a supply voltage received by the switches; and
a driving controller configured to generate the control signal based on the level measured by the voltage meter.

20. An electronic device comprising:
an inductive element configured to generate an output signal based on a current; and
a transmission circuit configured to:
adjust an intensity of the current such that the intensity of the current does not exceed a target value and provide the current to the inductive element;
increase the intensity of the current from zero to a first reference value that is equal to or less than the target value in a first time interval;
decrease the intensity of the current to a second reference value that is less than the first reference value in a second time interval in response to the intensity of the current becoming equal to or greater than the first reference value;
increase the intensity of the current in a third time interval in response to the intensity of the current becoming equal to or less than the second reference value in the second time interval;
decrease the intensity of the current to zero in a fourth time interval; and
alternately repeat the second time interval and the third time interval between the first time interval and the fourth time interval.

* * * * *